United States Patent [19]
Toyoshi et al.

[11] Patent Number: 5,478,059
[45] Date of Patent: Dec. 26, 1995

[54] POWER STEERING TORSION BAR BIASED TO RETURN TO NEUTRAL

[75] Inventors: Yasuhisa Toyoshi, Okazaki; Morihiro Matsuda, Toyota; Tomio Okamoto, Kariya; Tsuguhiro Fujita; Susumu Sukeda, both of Toyota, all of Japan

[73] Assignee: Toyota Jidosha Kabushiki Kaisha, Aichi, Japan

[21] Appl. No.: 222,922

[22] Filed: Apr. 5, 1994

[30] Foreign Application Priority Data

Apr. 22, 1993 [JP] Japan .................................. 5-096085
Jan. 25, 1994 [JP] Japan .................................. 6-006240

[51] Int. Cl.$^6$ ............................. B62D 5/00; B62D 5/083
[52] U.S. Cl. ...................... 267/273; 91/375 A; 74/388 PS
[58] Field of Search .................................. 180/146, 150; 267/150, 154, 273, 276, 277, 279, 284; 91/375 A; 403/360, 361, 164, 165, 92, 97, 100, 203, 204, 365; 74/388 PS, 492

[56] References Cited

U.S. PATENT DOCUMENTS

| | | | |
|---|---|---|---|
| 3,371,940 | 3/1968 | Sinclair et al. | 267/273 X |
| 4,774,847 | 10/1988 | Breitweg | 91/375 A X |
| 5,050,443 | 9/1991 | Stocker | 267/150 X |
| 5,233,906 | 8/1993 | Bishop et al. | 91/375 A |

FOREIGN PATENT DOCUMENTS

| | | |
|---|---|---|
| 0038493 | 10/1981 | European Pat. Off. . |
| 0290698 | 5/1987 | European Pat. Off. . |
| 2520460 | 7/1983 | France .................. 403/164 |
| 2191269 | 8/1987 | Japan . |
| 2-45109 | 11/1990 | Japan . |
| WO87/02318 | 4/1987 | WIPO . |

*Primary Examiner*—Josie A. Ballato
*Attorney, Agent, or Firm*—Oliff & Berridge

[57] ABSTRACT

A torsion bar device includes a torsion bar having a torsional portion, an upper connecting portion associated with an input shaft, and a lower connecting portion associated with an output shaft; a first cylinder for encompassing the torsional portion, one end of the first cylinder being connected to one of the upper and lower connecting portions, and the other end of the first cylinder extending in the longitudinal direction of the torsion bar to the other connecting portion of the torsion bar; a second cylinder for encompassing and being connected to the other one of the upper and lower connecting portions of the torsion bar; a first supporting member for supporting the torsion bar at the other end of the first cylinder in a circumferential direction of the torsion bar; a second supporting member for supporting the torsion bar in the circumferential direction at a portion of the second cylinder where the second supporting member is aligned with the first supporting member; and an elastic member for elastically restoring the alignment of the first and second supporting members by applying a force in a direction opposite to a torsionally stressed circumferential direction of the torsion bar when a steering wheel is turned so as to regain the original neutral position of the steering wheel.

14 Claims, 21 Drawing Sheets

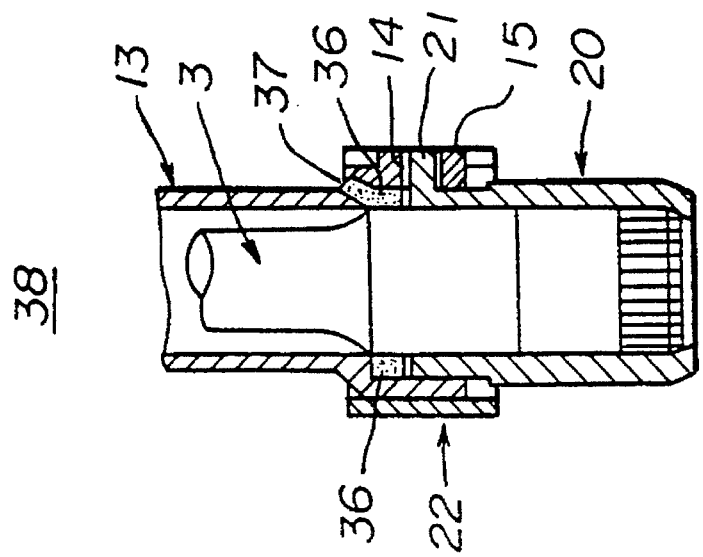
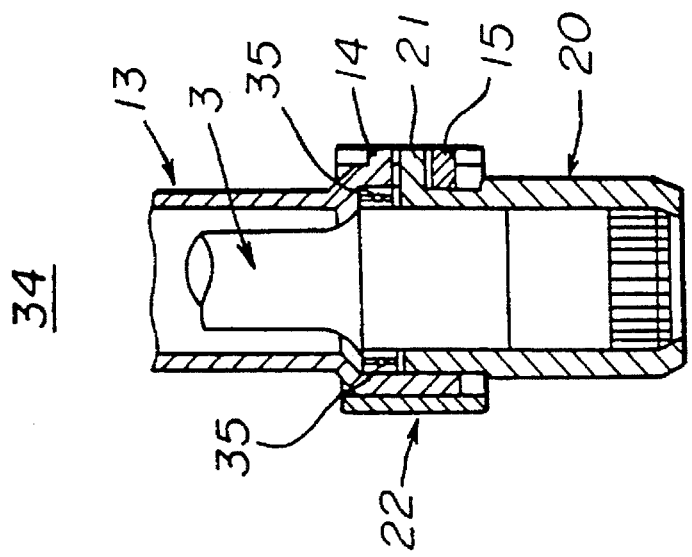
FIG. IID
FIG. IIC

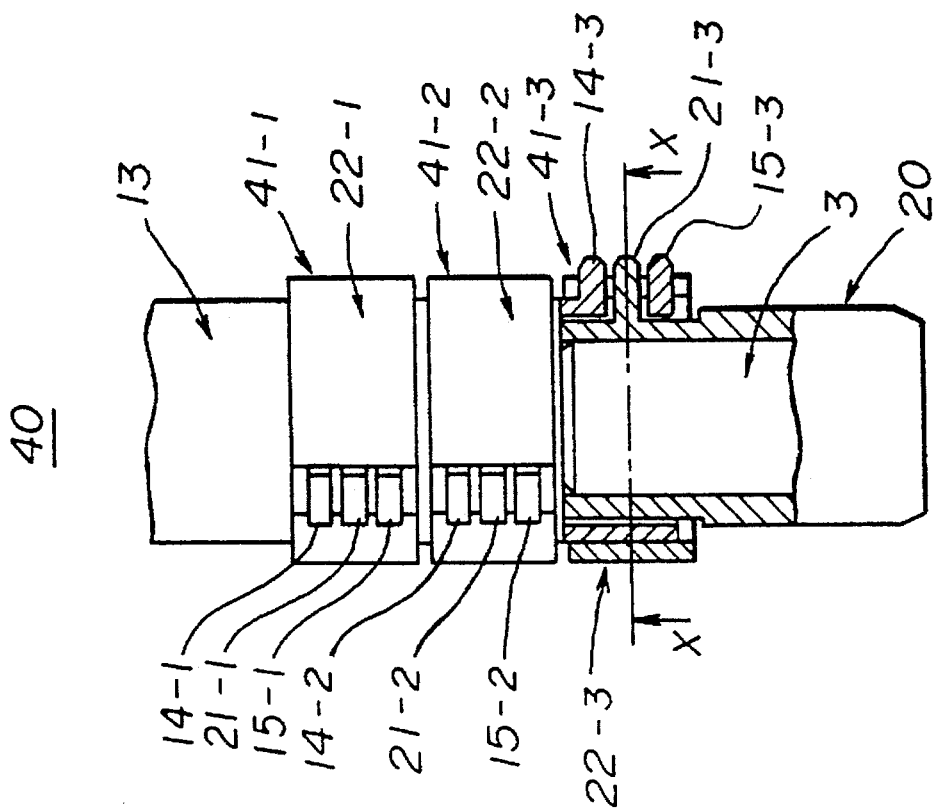

POWER STEERING TORSION BAR BIASED TO RETURN TO NEUTRAL

BACKGROUND OF THE INVENTION (1) Field of the Invention

The present invention generally relates to a torsion bar device for a power steering system, and more particularly to a torsion bar device which biases a torsion bar by means of supporting portions so as to regain the original neutral position of the steering wheel after the steering wheel is turned.

(2) Description of the Related Art

A power steering of an automotive vehicle is a power-assisted device which facilitates the turning of a steering wheel by a vehicle operator. In order to achieve the function of the power steering, it is necessary to provide a torsion bar device which stably regains the original neutral position of the steering wheel after the steering wheel is turned.

A rotary valve type power steering system including an input shaft, a torsion bar, and an output shaft is known. The rotation of the steering wheel turned by a vehicle operator is transferred to a rotary valve through the input shaft, the torsion bar and the output shaft. Pressure oil from an oil pump is supplied to a power cylinder, and the supplied oil in the power cylinder is supplied back to the oil pump, in accordance with the rotation of the steering wheel. The turning of the steering wheel by the vehicle operator is facilitated by the power cylinder to which the pressure oil is supplied.

The known power steering system includes a valve mechanism which inherently lowers the rigidity of the steering gear mechanism when the steering wheel is around its original neutral position. The known power steering system has a problem in that the steering gear mechanism becomes less rigid when the steering wheel is around the original neutral position. This problem is more appreciable to the operator during high speed running or slalom running of the automotive vehicle.

Several torsion bar mechanisms for enhancing the rigidity of the steering gear mechanism of the power steering system when the steering wheel is around its original neutral position have been proposed.

For example, Japanese Published Utility Model Application No. 2-45109 discloses a proposed torsion bar mechanism. The proposed mechanism is provided in a rotary valve type power steering system for biasing the torsion bar with an elastic force so as to regain the original neutral position of the steering wheel. The proposed mechanism includes two V-grooves on the periphery of the input shaft, two balls fitted in the holes of the output shaft at positions corresponding to the V-grooves, and an annular spring member arranged on the output shaft for pressing the balls onto the V-grooves so as to regain the original neutral position of the steering wheel after the steering wheel is turned.

However, in the case of the proposed mechanism disclosed in the above mentioned publication, it is necessary that the input and output shafts of the power steering system are modified to arrange the V-grooves, the balls and the spring member on the input and output shafts. In addition, the structure of the proposed mechanism is complicated and the manufacturing processes thereof are time consuming, and the productivity and cost performance of the proposed mechanism is relatively low.

Therefore, in order to adapt the proposed mechanism to the existing production vehicles, the structure of the input and output shafts of the power steering system must be modified. It is very difficult to adapt the proposed mechanism to the production vehicles by simply replacing the torsion bar by the proposed mechanism. The modification of the power steering system makes the productivity and the cost performance lower.

SUMMARY OF THE INVENTION

Accordingly, it is a general object of the present invention to provide an improved torsion bar device in which the above described problem is eliminated.

Another, more specific object of the present invention is to provide a torsion bar device which biases, by itself, the torsion bar in the circumferential direction, and stably regains the original neutral position of the steering wheel.

The other object of the present invention is to provide a torsion bar device which has a simple structure and needs no modification of the other parts related to the power steering system, so that the productivity and cost performance of the power steering system are increased.

The above mentioned objects of the present invention are achieved by a torsion bar device which includes a torsion bar having a torsional portion, an upper connecting portion associated with an input shaft, and a lower connecting portion associated with an output shaft; a first cylinder for encompassing the torsional portion of the torsion bar, one end of the first cylinder being connected to one of the upper and lower connecting portions of the torsion bar, and the other end of the first cylinder extending in the longitudinal direction of the torsion bar to the other connecting portion of the torsion bar; a second cylinder for encompassing and being connected to the other one of the upper and lower connecting portions of the torsion bar; a first supporting member for supporting the torsion bar at the other end of the first cylinder in a circumferential direction of the torsion bar; a second supporting member for supporting the torsion bar in the circumferential direction at a portion of the second cylinder where the second supporting member is aligned with the first supporting member; and an elastic member for elastically restoring the alignment of the first and second supporting members by applying a force in a direction opposite to a torsionally stressed circumferential direction of the torsion bar when a steering wheel is turned so as to regain the original neutral position of the steering wheel.

According to the present invention, it is possible to easily adapt the torsion bar device to the existing production vehicles by replacement of the conventional torsion bar by the torsion bar device of the present invention. The structure of the torsion bar device of the present invention is simple and needs no modification of the other parts related to the power steering system. Thus, the structure of the power steering system incorporating the torsion bar device can be simplified, and the productivity and cost performance thereof can be remarkably increased.

BRIEF DESCRIPTION OF THE DRAWINGS

The above and other objects, features and advantages of the present invention will be made apparent from the following detailed description when read in conjunction with the accompanying drawings in which:

FIGS. 11A through 11D are enlarged sectional views showing modifications of the torsion bar device of the second embodiment in FIG. 10;

FIGS. 12A and 12B are diagrams showing a torsion bar device of the third embodiment of the present invention;

DESCRIPTION OF THE PREFERRED EMBODIMENTS

Figure 1:
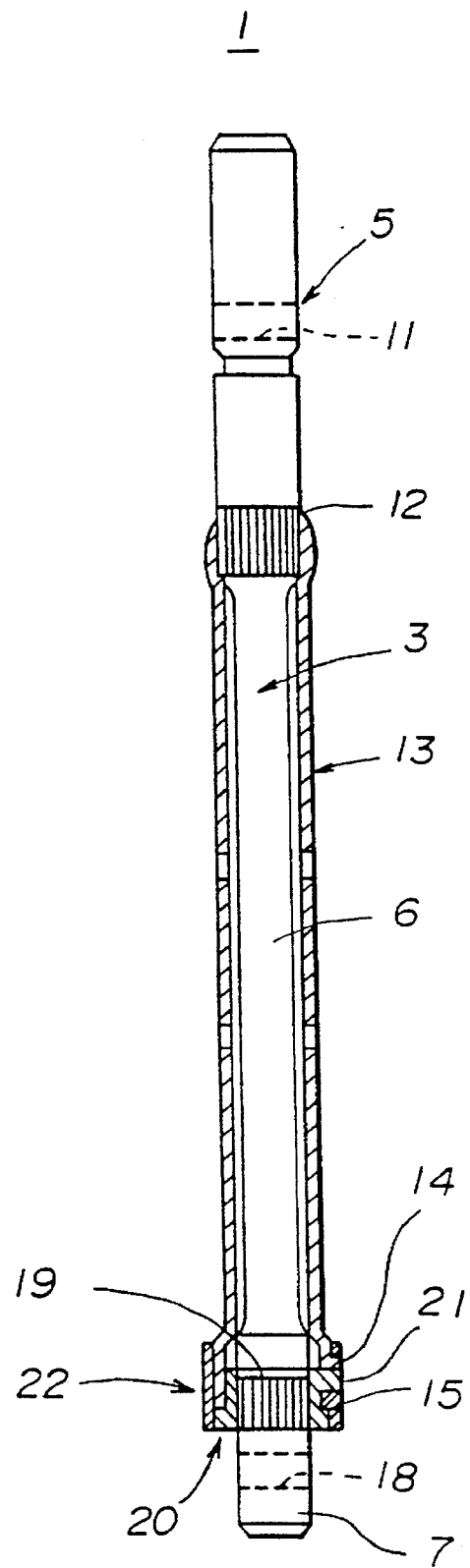
FIG. 1 is a sectional view showing a torsion bar device of the first embodiment of the present invention.
Figure 2:
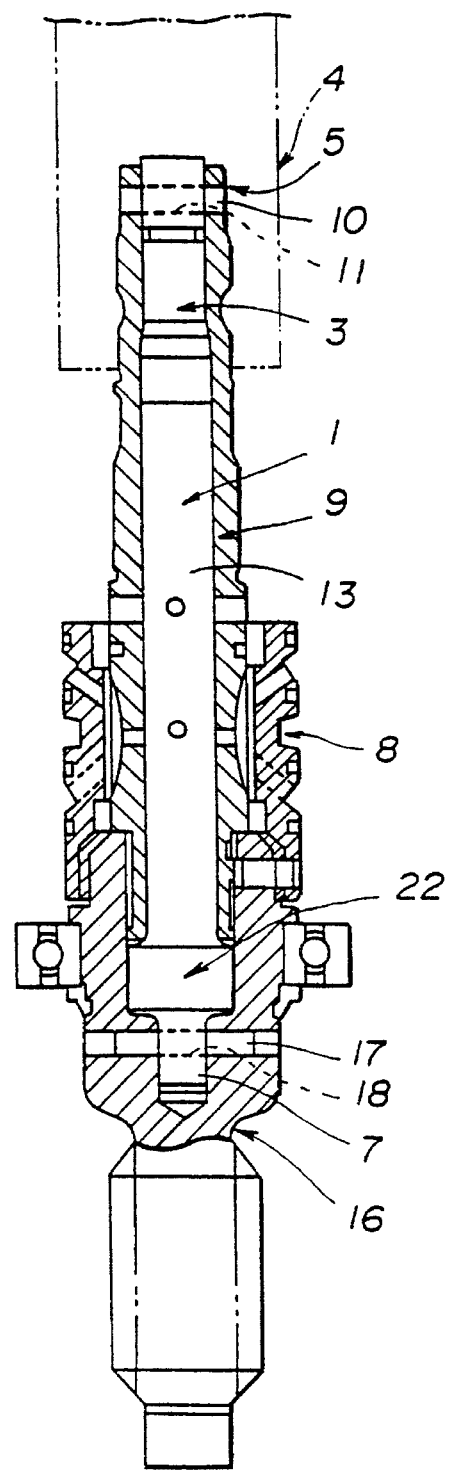
FIG. 2 is a sectional view showing a power steering system to which the torsion bar device in FIG. 1 is applied.

A description will now be given of the first embodiment of the present invention. FIG. 1 shows a torsion bar device of the first embodiment of the present invention. FIG. 2 shows a power steering system to which the torsion bar device in FIG. 1 is applied.

In FIG. 2, a power steering system 2 comprises an input shaft 4, a torsion bar device 1, and an output shaft 16. The torsion bar device 1 comprises a torsion bar 3, and the top of the torsion bar 3 is connected to the input shaft 4 through a shaft 9. The input shaft 4 is associated with a steering wheel (not shown) which is turned by a vehicle operator. As shown in FIG. 2, the shaft 9 is connected to the input shaft 4, and the torsion bar 3 and the shaft 9 are coupled to each other by a pin 10.

The torsion bar 3 comprises an upper connecting portion 5, a lower connecting portion 7, and a torsional portion 6 between the connecting portions 5 and 7. The upper connecting portion 5 has a transverse opening 11 in which the pin 10 is fitted. The torsional portion 6 is twisted when the steering wheel (not shown) is turned while the torsion bar 3 is subjected to a return force exerted by the tires (not shown) of the vehicle.

The lower connecting portion 7 has a transverse opening 18 in which a pin 17 is fitted. The lower connecting portion 7 is secured to the output shaft 16 by the pin 17. The output shaft 16 is, for example, a pinion of the power steering system.

The torsion bar 3 has a serrated portion 12 between the upper connecting portion 5 and the torsional portion 6, and a serrated portion 19 on the lower connecting portion 7. A first cylinder 13 is connected at its top with the serrated portion 12 of the torsion bar 3. This first cylinder 13 is a hollow member, and the inside diameter of the first cylinder 13 is slightly greater than the outside diameter of the torsional portion 6. Thus, the first cylinder 13 encompasses the torsional portion 6 of the torsion bar 3.

The first cylinder 13 is formed with a set of first supporting portions 14 and 15 which outwardly project in the radial direction of the first cylinder 13. The bottom of the first cylinder 13 is attached to a second cylinder 20, and the second cylinder 20 is secured to the serrated portion 19 of the lower connecting portion 7 of the torsion bar 3.

The second cylinder 20 is a hollow member, and the inside diameter of the second cylinder 20 is almost equal to the outside diameter of the lower connecting portion 7. The axial width of the second cylinder 20 is almost the same as the axial width of the serrated portion 19. The second cylinder 20 is secured to the serrated portion 19. Thus, the first cylinder 13 is connected to the lower connecting portion 7 of the torsion bar 3 through the connection of the serrated portion 19 and the second cylinder 20.

The second cylinder 20 is formed with a second supporting portion 21 which outwardly projects in the radial direction of the second cylinder 20. As shown in FIG. 1, the first cylinder 13 and the second cylinder 20 are connected to each other in a manner such that the first supporting portions 14 and 15 and the second supporting portion 21 are aligned in the longitudinal direction of the first cylinder 13.

Figure 6:
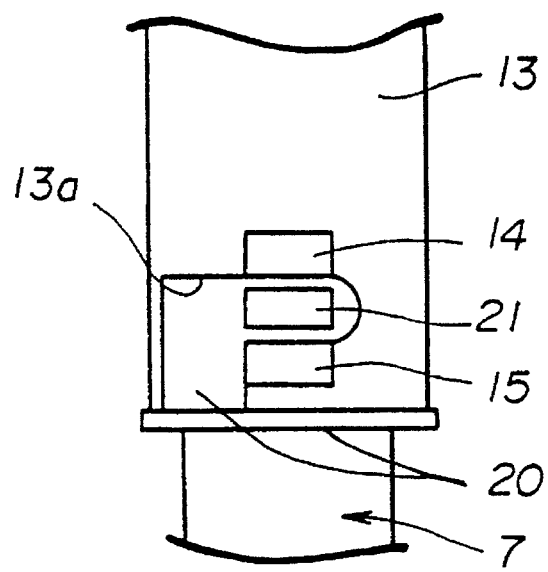
FIGS. 6 and 7 are diagrams showing assembly conditions in which a first cylinder and a second cylinder are connected to each other.

FIG. 6 shows an assembly condition in which the first cylinder and the second cylinder are connected to each other. As shown in FIG. 6, the first cylinder 13 is formed at its bottom portion with an inverted-L opening 13a. The second supporting portion 21 of the second cylinder 20 is loosely fitted in the opening 13a of the first cylinder 13, and the second supporting portion 21 is arranged between the first supporting portions 14 and 15.

The torsion bar device 1 includes an elastic member, arranged on the first cylinder 13, for elastically restoring the alignment of the first supporting portions 14 and 15 and the second supporting portion 21 by exerting a force in the circumferential direction of the torsion bar 3. The elastic member of this embodiment is a C-spring 22, and the C-spring 22 has a gap 22a in which the supporting portions 14, 15 and 21 are fitted by using the elastic compression force of the C-spring 22. Thus, the C-spring 22 biases the first and second supporting portions 14, 15 and 21 so as to regain the original neutral position after the steering wheel is turned by a vehicle operator.

The adjusting operation to align the first and second supporting portions 14, 15 and 21 in the longitudinal direction of the first cylinder 13 can be easily performed by rotating the first cylinder 13 relative to the serrated portion 12 and rotating the second cylinder 20 relative to the serrated portion 19 in the circumferential direction of the first cylinder 13.

Figure 7:
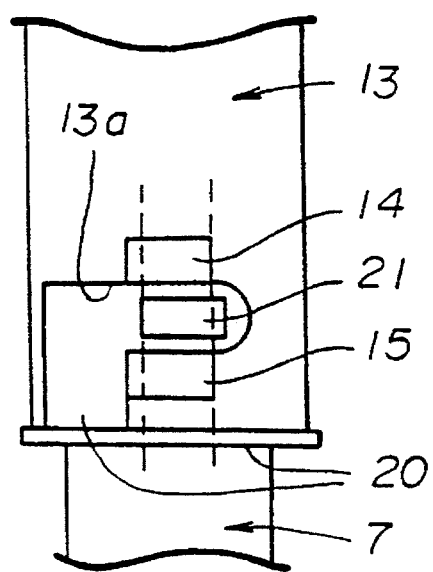

FIG. 7 shows an assembly condition in which the first cylinder and the second cylinder are connected to each other. In the assembly condition shown in FIG. 7, there is a rotational difference angle between the circumferential positions of the first supporting portions 14, 15 and the circumferential position of the second supporting portion 21. If the torsion bar device after the first and second cylinders are attached to the torsion bar is in the assembly condition shown in FIG. 7, the supporting portions 14, 15 and 21 may be cut along the dotted lines in FIG. 7 so that the supporting portions 14, 15 and 21 are aligned along a longitudinal line of the first cylinder 20.

Figure 3A:
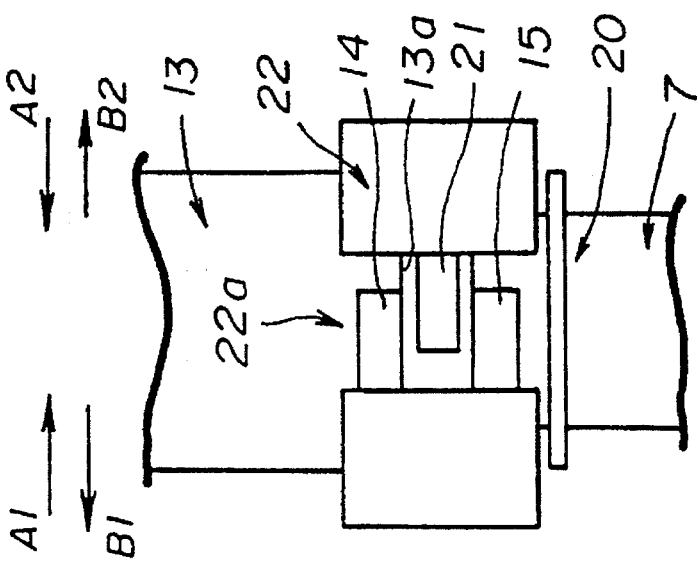
FIGS. 3A and 3B are diagrams showing assembly conditions in which a C-spring is attached to the torsion bar device in FIG. 1.
Figure 3B:
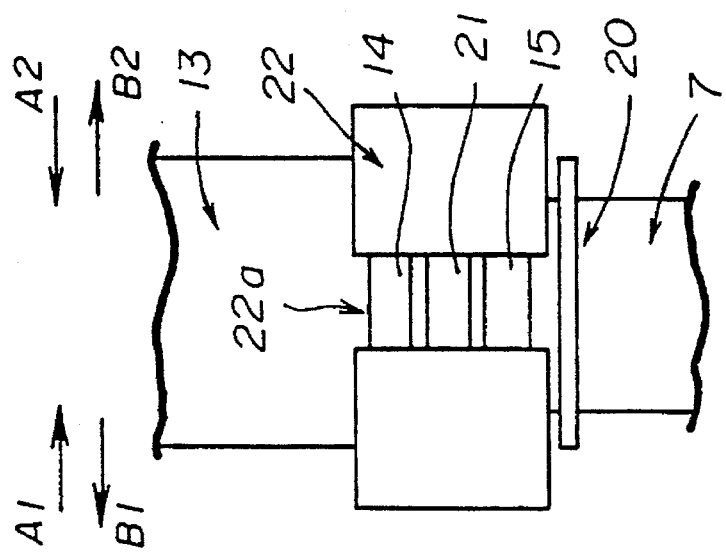

FIGS. 3A and 3B show assembly conditions in which the C-spring 22 is attached to the first cylinder 13 and the second cylinder 20. The first supporting portions 14 and 15 and the second supporting portion 21 are fitted into the gap 22a of the C-spring 22, and the supporting portions 14, 15 and 21 are elastically compressed by the C-spring 22 in circumferential directions indicated by arrows "A1" and "A2" in FIGS. 3A and 3B. The compression force of the C-spring 22 acts on the torsion bar 3 to regain the original neutral position of the steering wheel when it is turned.

FIG. 3A shows the assembly condition in which the C-spring 22 is attached to the first cylinder 13 and the second cylinder 20 with the input shaft 4 and the output shaft 16 having no rotational difference angle. In the condition shown in FIG. 3B, the supporting portions 14, 15 and 21 are aligned along a longitudinal line of the first cylinder 20.

When the steering wheel is turned by the vehicle operator, the input shaft 4 and the output shaft 16 have a rotational difference angle. As the upper connecting portion 5 associated with the input shaft 4 is moved relative to the lower connecting portion 7 associated with the output shaft 16, the torsion bar 3 is twisted. Thus, the first cylinder 13 connected to the upper connecting portion 5 and the second cylinder 20 connected to the lower connecting portion 7 also have a rotational difference angle.

FIG. 3B shows the assembly condition in which the first cylinder 13 and the second cylinder 20 have a rotational difference angle when the steering wheel is turned. In the condition shown in FIG. 3B, the first supporting portions 14 and 15 of the first cylinder 13 are moved in the circumferential direction "B1" and the second supporting portion 21 of the second cylinder 20 is moved in the circumferential direction "B2". The first supporting portions 14 and 15 and the second supporting portion 21 move apart from each other. The gap 22a of the C-spring 22 is widened by the first and second supporting portions 14, 15 and 21 in the circumferential direction. The first and second supporting portions 14, 15 and 21 are thus subjected to the compression force of the C-spring 22. The compression force of the C-spring 22 at this time acts on the torsion bar 3 to regain the original neutral position of the steering wheel.

Figure 4:
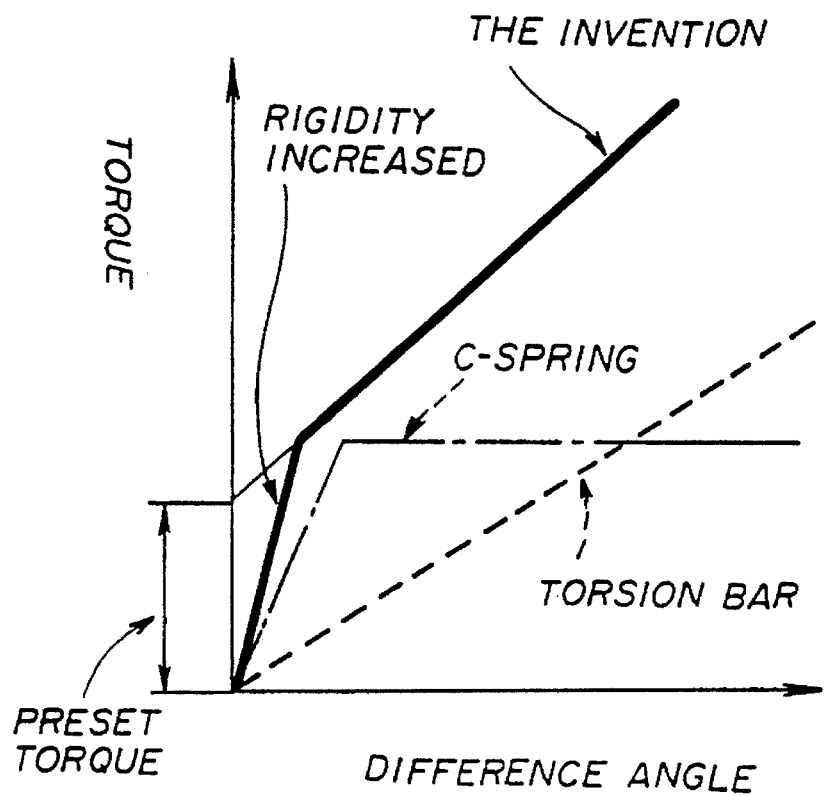
FIG. 4 is a chart showing a torque characteristic of the torsion bar device of the present invention.

FIG. 4 shows the torque characteristic of the torsion bar device indicating the relationship between the difference angle and the required torque. The difference angle is a rotational difference angle between the input shaft 4 and the output shaft 16 with respect to the circumferential direction. The overall torque characteristic of the torsion bar device of the present invention is indicated by a solid line in FIG. 4. The torque characteristic of the torsion bar alone is indicated by a dotted line in FIG. 4. The torque characteristic of the C-spring is indicated by a dotted chain line in FIG. 4.

It should be noted that the torque characteristic of the torsion bar device of the present invention in FIG. 4 is equivalent to the resultant torque of the required torque of the torsion bar 3 and the required torque of the C-spring 22. As shown in FIG. 4, the torque characteristic of the torsion bar 3 is a linear relationship between the difference angle and the required torque. The required torque of the torsion bar device 1 of the present invention, corresponding to the difference angle around the original neutral position of the steering wheel, can be increased relative to that of the torsion bar 3 as indicated in FIG. 4. The rigidity (or the spring constant) of the torsion bar device of the present invention when the steering wheel is around its original neutral position is increased, and it becomes possible for the torsion bar device to increase the stability and operability of the steering wheel.

The rigidity of the torsion bar device when the steering wheel is around its original neutral position is determined based on the rigidity of the C-spring 22 and the rigidity of the first and second cylinders 13 and 20. By selecting appropriate mechanical strength of the cylinders 13 and 20 and the C-spring 22, the rigidity of the torsion bar device according to the present invention can be suitably increased.

The torsion bar device 1 of the present invention is installed in the power steering system 2 shown in FIG. 2. In the power steering system 2, a rotary valve 8 is connected to a vane pump, a reservoir tank and a power cylinder. The parts of the power steering system 2, except for the rotary valve 8, are not shown in FIG. 2. The torsion bar 3 having the same function as the conventional torsion bar is connected to the input shaft 4 via the shaft 9. The upper connecting portion 5 is secured to the shaft 9 by the pin 10. The power connecting portion 7 is secured to the output shaft 16 by the pin 17. Thus, the torque of the steering wheel is transferred from the input shaft 4 to the output shaft 16 through the shaft 9, the pin 10, the torsion bar 3, and the pin 17 in this order.

When the steering wheel is turned, the rotary valve 8 and the shaft 9 have a rotational difference angle corresponding to the rotational difference between the input shaft 4 and the output shaft 16. The rotary valve 8 changes the oil passage in accordance with the rotational difference angle. The operating pressure oil is selectively supplied to either the right chamber or the left chamber of the power cylinder so that the tie rod, connected to the tires, is power-assisted by the operating pressure oil.

As the first cylinder 13, the second cylinder 20, and the C-spring 22 are merely attached to the torsion bar 3 so as to regain the original neutral position of the steering wheel, the operation of these parts 13, 20 and 22 is not related to the operation of the input shaft 4 and the output shaft 16. Thus, in order to install the torsion bar device 1 in the power steering system 2, it is not necessary to change the structure of the input shaft 4 and the output shaft 16. Hence, by installing the torsion bar device 1 of the present invention, it is possible to biase the first cylinder 13 and the second cylinder 20 for regaining the original neutral position of the steering wheel. In addition, the rigidity of the torsion bar device when the steering wheel is around its original neutral position can be increased in the torsion bar device 1 of the present invention.

In addition, it is possible to easily adapt the present invention to the existing production vehicles by replacing the conventional torsion bar by the torsion bar device 1 of the present invention. The structure of the torsion bar device of the present invention is simple and needs no modification of the other parts related to the power steering system. Thus, according to the present invention, the structure of the power steering system in which the torsion bar device is incorporated can be made simple, and the productivity and cost performance thereof can be remarkably increased.

Figure 5:
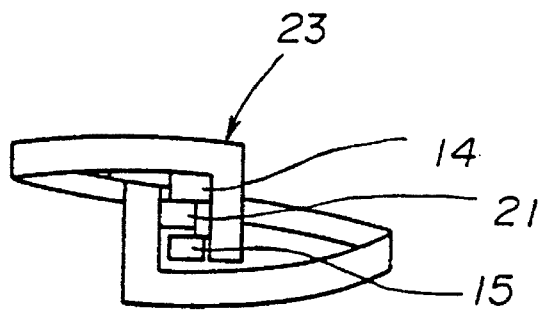
FIG. 5 is a diagram showing a modification of an elastic member of the torsion bar device of the present invention.

In the first embodiment described above, the C-spring 22 is used as the elastic member of the torsion bar device for elastically restoring the alignment of the first and second supporting portions 14, 15 and 21 along the longitudinal direction of the first cylinder 13. However, the present invention is not limited to this embodiment, and a different elastic member may be used instead of the C-spring. FIG. 5 shows a torsion coil spring as a modification of the elastic member of the torsion bar device, and this torsion coil spring 23 in FIG. 5 may be used instead. The first and second supporting portions 14, 15 and 21 are fitted in a snapping portion of the torsion coil spring 23, and the first and second supporting portions 14, 15 and 21 are retained by using the compression force of the torsion coil spring 23.

Figure 8:
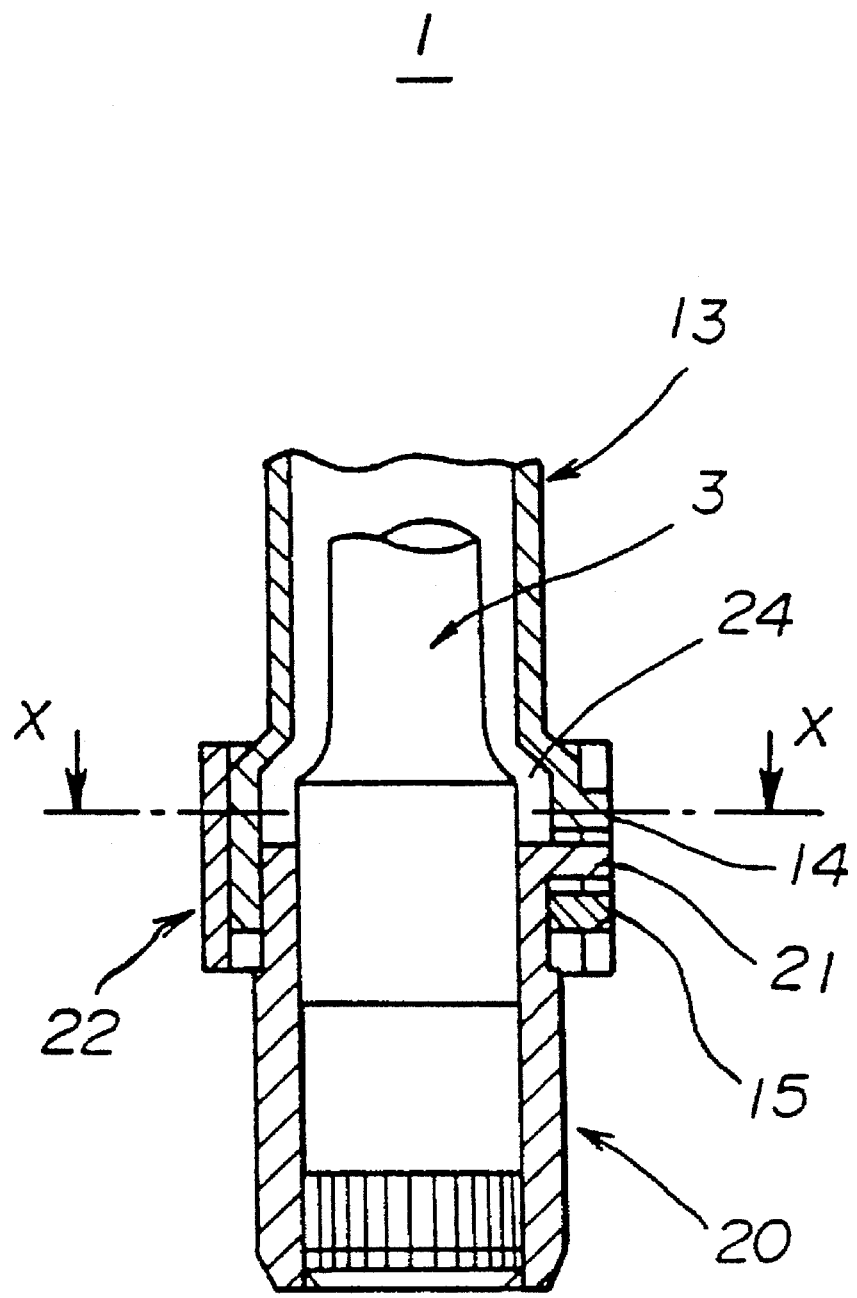
FIG. 8 is an enlarged sectional view showing the torsion bar device of the first embodiment of the present invention.
Figure 9A:
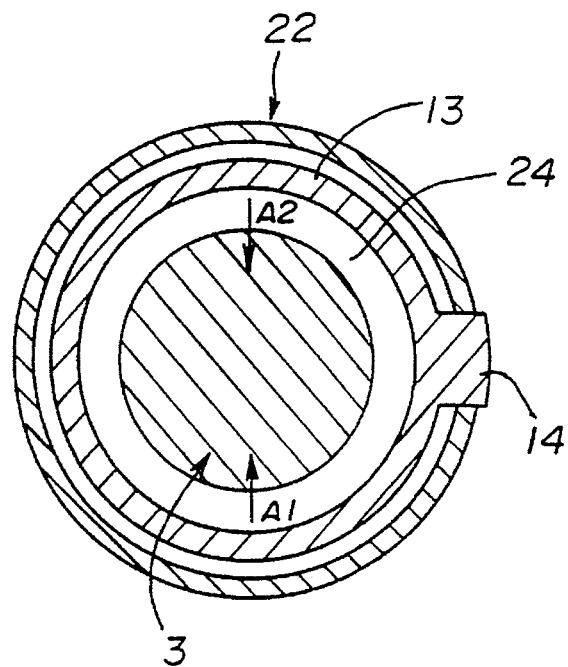
FIGS. 9A and 9B are cross-sectional views of the torsion bar device taken along a line X—X in FIG. 8.
Figure 9B:
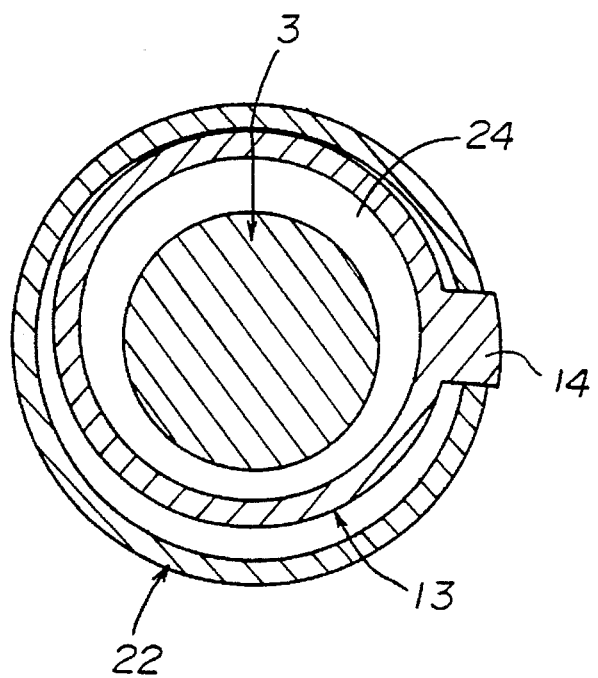

FIG. 8 shows the supporting portions 14, 15 and 21 of the torsion bar device of the first embodiment. FIGS. 9A and 9B show the cross-sections of the torsion bar device taken along a line X—X in FIG. 8, which line is located near the supporting portions 14, 15 and 21.

In the above described first embodiment, the torsion bar 3 is simply accommodated in the first cylinder 3, and the inside diameter of the first cylinder 3 is slightly greater than the outside diameter of the torsion bar 3. Thus, the torsion bar device 1 has a clearance space 24 between the torsion bar 3 and the first cylinder 13 around the supporting portions 14, 15 and 21 to ensure the twisting deformation of the torsion bar 3.

However, when the torsion bar 3 is twisted due to the turning of the steering wheel, the C-spring 22 is expanded in the circumferential direction through the connection of the first cylinder 13 and the second cylinder 20. As the torsion bar device 1 has merely the clearance space 24 between the first cylinder 13 and the torsion bar 3, the first cylinder 13 is horizontally moved relative to the torsion bar 3 due to the reaction force from the C-spring 22. The supporting portions 14, 15 and 21 at this time will become the center around which the first cylinder 13 is horizontally moved relative to the torsion bar 3.

FIG. 9A shows the directions "A1" and "A2" of the movement of the first cylinder 13 wherein the first cylinder 13 is horizontally moved within the clearance space 24 relative to the torsion bar 3 in either direction. FIG. 9B shows a condition in which the first cylinder 13 is moved in the direction "A1" relative to the torsion bar 3. As shown in these drawings, the torsion bar device of the first embodiment has a problem in that the first cylinder 13 may be moved relative to the torsion bar 3 when the torsion bar 3 is twisted and the C-spring is expanded. If the first cylinder 13 is brought into contact with either the C-spring 22 or the torsion bar 3 by such a movement, the rigidity of the torsion bar 3 and the C-spring 22 varies considerably. Therefore, the torsion bar device of the first embodiment at this time may not stably regain the original neutral position of the steering wheel, and the rigidity of the torsion bar device when the steering wheel is around the neutral position is relatively low.

In order to eliminate the above described problems of the first embodiment while the features and advantages of the present invention are maintained, the second and third embodiments of the present invention are proposed.

Figure 10:
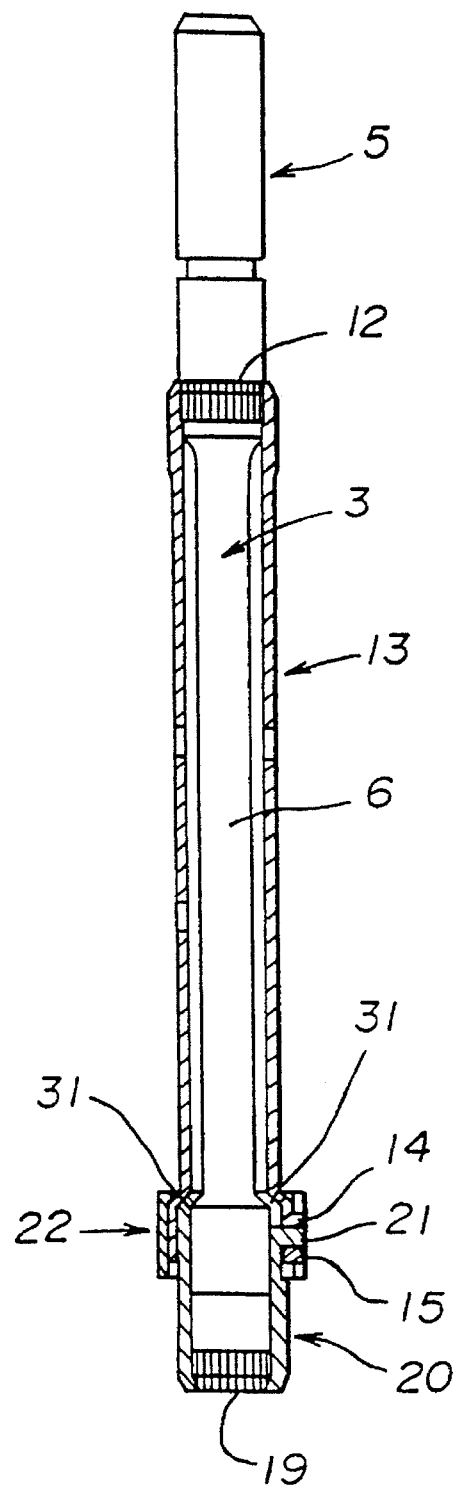
FIG. 10 is a sectional view showing a torsion bar device of the second embodiment of the present invention.

Next, a description will be given, with reference to FIGS. 10 and 11A, of the second embodiment of the present invention. FIG. 10 shows a torsion bar device 30 of the second embodiment of the present invention. FIG. 11A shows the detailed structure of the torsion bar device in FIG. 10 in the vicinity of the first and second supporting portions.

In FIGS. 10 and 11A–11D, the parts which are the same as corresponding parts in FIGS. 1 and 3A–3B are designated by the same reference numerals, and a description thereof will be omitted.

The torsion bar device 30, shown in FIGS. 10 and 11A, has a bushing 31 provided in the clearance space 24 between the first cylinder 13 and the torsion bar 3 near the first and second supporting portions 14, 15 and 21. The bushing 31 is made of a hard metal material with a suitable abrasion resistance. The bushing 31 is attached to the torsion bar device 30 by fitting it between the inside wall of the first cylinder 13 and the outside wall of the torsion bar 3 near the first supporting portion 14. It should be noted that the torsion bar 3 is rotatably supported by the bushing 31 while the bushing 31 is fitted between the first cylinder 13 and the torsion bar 3.

In the torsion bar device 30 of the second embodiment, the bushing 31 is provided in the clearance space 24 between the first cylinder 13 and the torsion bar 3 near the first and second supporting portions 14, 15 and 21. The first cylinder 13 is connected to the torsion bar 3 via the bushing 31, and it is rotatably supported by the bushing 31. When the torsion bar 3 is twisted and the C-spring 22 is expanded due to the turning of the steering wheel, it is likely that the first cylinder 13 is horizontally moved relative to the torsion bar 3 in the direction "A1" or "A2" as indicated in FIG. 9A. However, as the torsion bar device 30 has the bushing 31 in the clearance space 24 between the first cylinder 13 and the torsion bar 3, the bushing 31 at this time prevents the first cylinder 13 from being horizontally moved relative to the torsion bar 3.

Thus, in the torsion bar device 30 of the second embodiment, a restricting member (or the bushing 31) is provided for restricting the undesired horizontal movement of the first cylinder 13 relative to the torsion bar 3 when the torsion bar 3 is twisted and the C-spring 22 is expanded. It is thus possible for the torsion bar device of the second embodiment to more stably regain the original neutral position of the steering wheel, and the rigidity of the torsion bar device when the steering wheel is around its original neutral position can be remarkably increased.

Next, a description will be given, with reference to FIGS. 11B–11D, of a few modifications of the torsion bar device of the second embodiment.

Figure 11B:
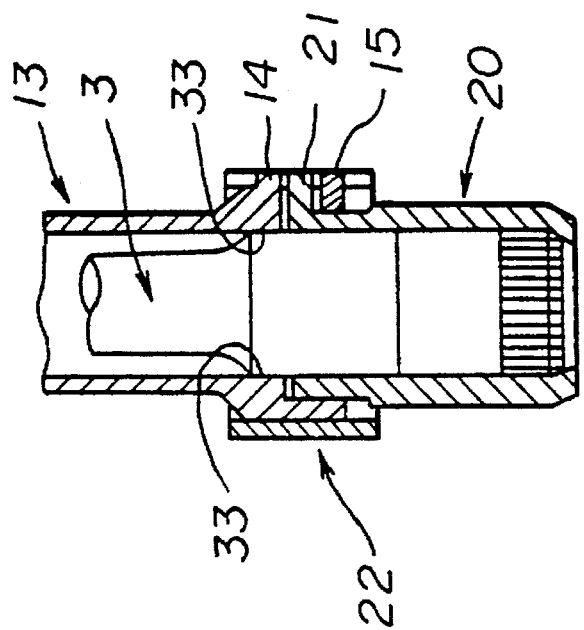
Figure 11A:
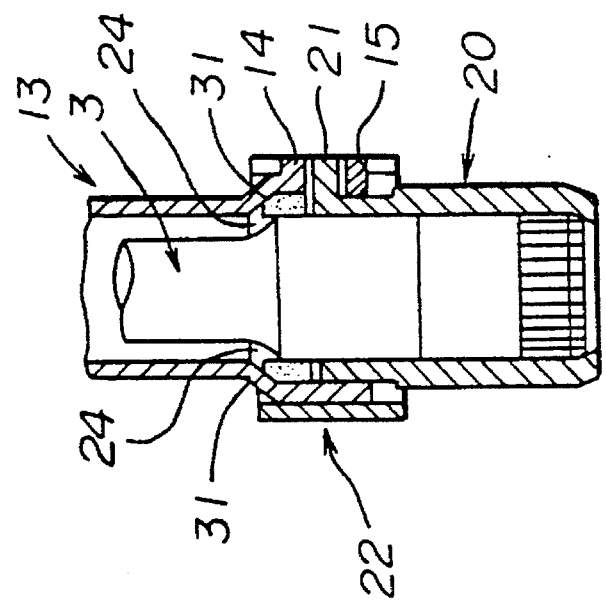

FIG. 11B shows a modification of the torsion bar device of the second embodiment in FIG. 10. In the torsion bar device 32 in FIG. 11B, the first cylinder 13 is formed with a bearing portion 33 near the first supporting portion 14, and no clearance between the first cylinder 13 and the torsion bar 3 is formed. The torsion bar device 32 in the assembled condition has the torsion bar 3 rotatably supported by the bearing portion 33.

In the torsion bar device 32 in FIG. 11B, the first cylinder 13 is formed with the bearing portion 33, and the torsion bar 3 is rotatably supported by the bearing portion 33. The first cylinder 13 is directly in contact with the torsion bar 3 via the bearing portion 33. Accordingly, when the torsion bar 3 is twisted and the C-spring 22 is expanded, the bearing portion 33 prevents the first cylinder 13 from being horizontally moved relative to the torsion bar 3. It is thus possible to stably regain the original neutral position of the steering wheel, and the rigidity of the torsion bar device when the steering wheel is around its original neutral position can be increased.

FIG. 11C shows another modification of the torsion bar device of the second embodiment in FIG. 10. In the torsion bar device 34 in FIG. 11C, a ball bearing 35 is provided between the first cylinder 13 and the torsion bar 3 near the first supporting portion 14, and no clearance between the first cylinder 13 and the torsion bar 3 is formed there. One of two methods for attaching the ball bearing 35 to the torsion bar device 34 is selectable. One method is to press-fit the ball bearing 35 in the first cylinder 13, and then arrange the first cylinder 13 having the ball bearing 35 onto the torsion bar 3. The other method is to press-fit the ball bearing 35 onto the torsion bar 3, and then place the torsion bar 3 having the ball bearing 35 into the first cylinder 13.

In the torsion bar device 34 in FIG. 11C, the ball bearing 35 is provided between the first cylinder 13 and the torsion bar 3 in the vicinity of the first supporting portion 14, and the torsion bar 3 is rotatably supported by the ball bearing 35. Accordingly, when the torsion bar 3 is twisted and the C-spring 22 is expanded, the ball bearing 35 prevents the first cylinder 13 from being horizontally moved relative to the torsion bar 3. It is thus possible to stably regain the original neutral position of the steering wheel, and a high rigidity of the torsion bar device when the steering wheel is around the neutral position can be maintained. Also, the sliding friction between the first cylinder 13 and the torsion bar 3 can be suitably reduced by the ball bearing 35, and the sensitivity of the power steering system to the vehicle operator can be increased by means of the torsion bar device 34.

In addition, in the case of the torsion bar device 34 in FIG. 11C, a known needle bearing may be provided between the first cylinder 13 and the torsion bar 3 instead of the ball bearing 35.

FIG. 11D shows another modification of the torsion bar device of the second embodiment in FIG. 10. In the torsion bar device 38 in FIG. 11D, a resin portion 36 is provided between the first cylinder 13 and the torsion bar 3 near the first supporting portion 14, and no clearance between the first cylinder 13 and the torsion bar 3 is formed there. As shown in FIG. 11D, the first cylinder 13 is formed with an injection hole 37 near the first supporting portion 14. The resin portion 36 is formed by injecting resin from the injection hole 37 into a space between the first cylinder 13 and the torsion bar 3 after the first cylinder 13 is attached to the torsion bar 3. After the resin is injected, the first cylinder 13 is separated from the resin portion 36 while the torsion bar 3 and the resin portion 36 are attached to each other, so that the first cylinder 13 is rotatably supported by the resin portion 36. Alternatively, after the resin is injected, the torsion bar 3 is separated from the resin portion 36 while the first cylinder 13 and the resin portion 36 are attached, so that the first cylinder 13 is rotatably supported by the resin portion 36.

In the torsion bar device 38 in FIG. 11D, the resin portion 36 is formed between the first cylinder 13 and the torsion bar 3 in the vicinity of the first supporting portion 14. When the torsion bar 3 is twisted and the C-spring 22 is expanded due to the turning of the steering wheel, the resin portion 36 prevents the first cylinder 13 from being horizontally moved relative to the torsion bar 3. It is thus possible to stably regain the original neutral position of the steering wheel, and the rigidity of the torsion bar device when the steering wheel is around its original neutral position can be increased.

In addition, in the torsion bar device of the second embodiment, it is not necessary to provide the bushing 31, the bearing portion 33 or the resin portion 36 throughout all the periphery of the torsion bar 3. It is sufficient to place one of the bushing 31, the bearing portion 33 and the resin portion 36 at two opposing peripheral portions of the first cylinder 13 only, so that it prevents the movement of the first cylinder 13 in the directions "A1" and "A2" in FIG. 9A.

Figure 12B:
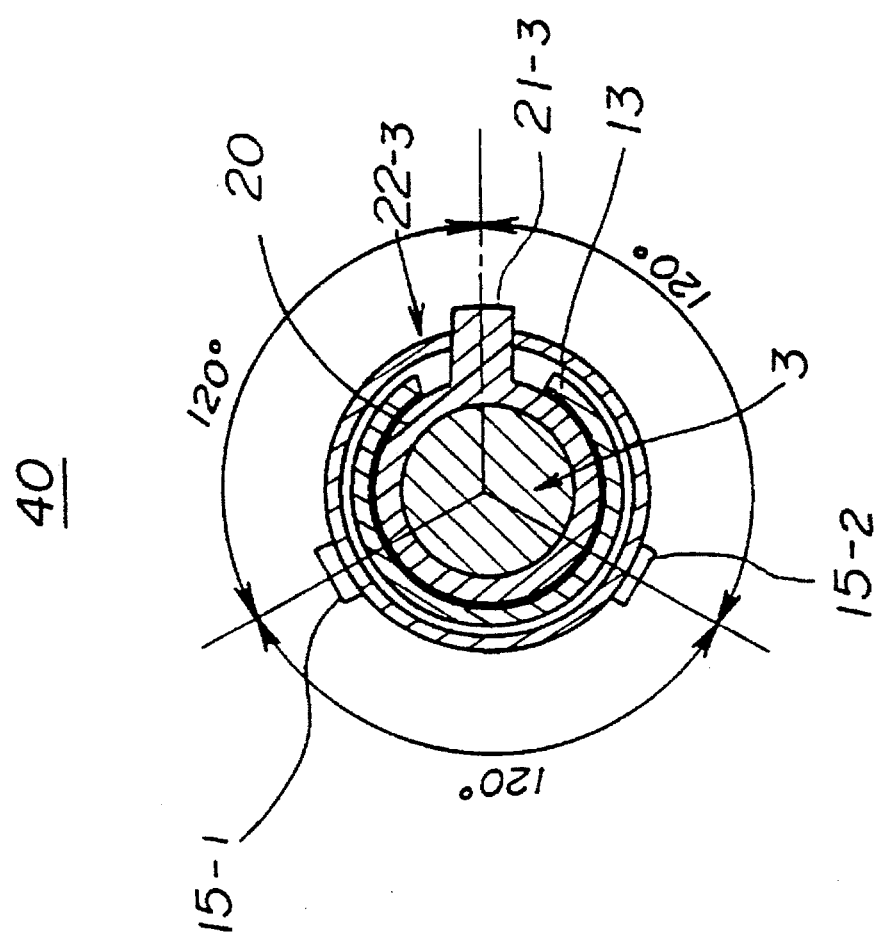

Next, a description will be given, with reference to FIGS. 12A and 12B, of the third embodiment of the present invention. FIG. 12A shows a torsion bar device 40 of the third embodiment of the present invention, and it is partially cut away to show the first and second supporting portions of one pre-load unit of the torsion bar device 40. FIG. 12B shows a cross section of the torsion bar device 40 of the third embodiment taken along a line X—X in FIG. 12A. In FIGS. 12A and 12B, the parts which are the same as corresponding parts in FIGS. 1 and 3A–3B are designated by the same reference numerals, and a description thereof will be omitted.

The torsion bar devices of the first and second embodiments have a single pre-load unit including the first and second supporting portions 14, 15 and 21, and the C-spring 22. The torsion bar device 40 of the third embodiment, shown in FIGS. 12A and 12B, has three pre-load units 41-1, 41-2 and 41-3 each of which includes the first and second supporting portions and the C-spring. The three pre-load units are arranged in a column on the first cylinder 13 near the enlarged second cylinder 20. The pre-load unit 41-1 includes first supporting portions 14-1 and 15-1, a second supporting portion 21-1, and a C-spring 22-1, and these parts are shown in FIG. 12A. The pre-load unit 41-2 includes first supporting portions 14-2 and 15-2, a second supporting portion 21-2, and a C-spring 22-2. The pre-load unit 41-3 includes first supporting portions 14-3 and 15-3, a second supporting portion 21-3, and a C-spring 22-3.

As shown in FIG. 12B, the respective supporting portions of the three pre-load units 41-1 through 41-3 are uniformly arranged on the circumference of the torsion bar 3, and the rotational difference angle between the second supporting portions of two neighboring pre-load units when the steering wheel is at its original neutral position is equal to 120°. It should be noted that the first cylinder 13 of the third embodiment is formed with the first supporting portions 14-1 through 14-3 and 15-1 through 15-3, and that the second cylinder 20 is formed with the second supporting portions 21-1 through 21-3.

When the torsion bar 3 is twisted and the C-springs 22-1 through 22-3 are expanded due to the turning of the steering wheel, the reaction forces from the C-springs act on the first cylinder 13 so as to horizontally move the first cylinder 13 relative to the torsion bar 3. However, the respective supporting portions of the three pre-load units are uniformly arranged on the circumference of the torsion bar 3, and the respective reaction forces from the C-springs are canceled by each other and the reaction forces are in equilibrium. It is thus possible for the plurality of the pre-load units 41-1 through 41-3 to stably prevent the first cylinder 13 from being horizontally moved relative to the torsion bar 3 when the torsion bar 3 is twisted due to the turning of the steering wheel. Also, it is possible for the torsion bar device 40 of the third embodiment to stably prevent the first cylinder 13 from coming in contact with the torsion bar 3 or the C-springs when the steering wheel is turned.

The rigidity of the torsion bar device 40 of the third embodiment can be suitably increased by selecting an appropriate mechanical strength of the first and second cylinders 13 and 20 and the C-springs 22-1 through 22-3. Also, the rigidity of the torsion bar device 40 when the steering wheel is around its original neutral position is further increased by using the plurality of the pre-load units.

Next, a description will be given, with reference to FIGS. 13A through 14B, of a few modifications of the elastic member according to the present invention. In the above described embodiments, the C-spring 22 is used as the elastic member of the torsion bar device of the present invention. The following description relates to a few modifications of the elastic member according to the present invention.

Figure 13A:
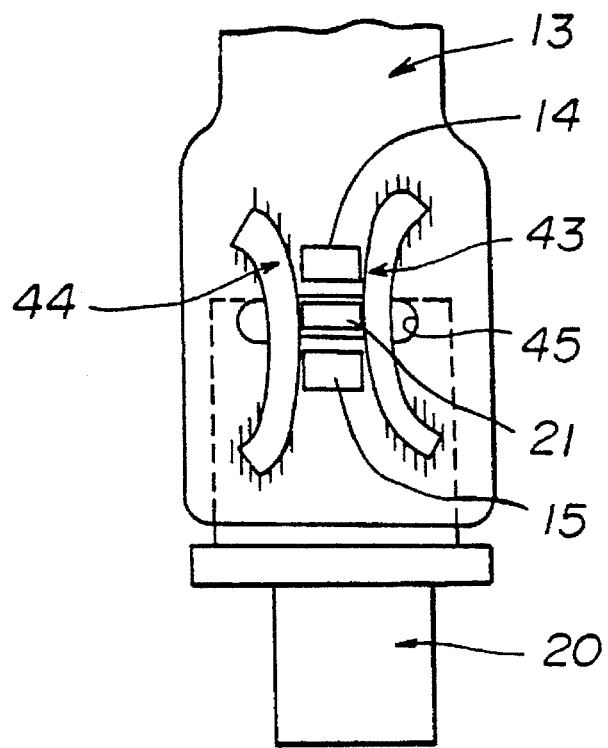
FIGS. 13A, 13B, 14A and 14B are diagrams showing modifications of the elastic member according to the present invention.

FIG. 13A shows a pair of flat springs 43 and 44 as a modification of the elastic member. The flat springs 43 and 44 are made of spring steel with a suitable mechanical strength. Both ends of the respective flat springs 43 and 44 are fixed onto the first cylinder 13 by welding. The welded portions of the flat springs 43 and 44 are indicated by shading lines in FIG. 13A. The first supporting portions 14 and 15 of the first cylinder 13 and the second supporting portion 21 of the second cylinder 20 are fitted on the inward-facing walls of both the flat springs 43 and 44. The first cylinder 13 is formed with a slot 45, and the second supporting portion 21 is inserted in the slot 45 and it outwardly projects from the first cylinder 13. Thus, the second supporting portion 21 is movable in the circumferential direction of the second cylinder 20 within the range of the slot 45.

In the elastic member shown in FIG. 13A, the flat springs 43 and 44 retain the first and second supporting portions 14, 15 and 21 against the inward-facing walls of the flat springs, so as to regain the original neutral position when the steering wheel is turned. The flat springs 43 and 44 can be installed on the first cylinder 13 of the torsion bar device more easily than the C-spring 22 described above. Also, as the flat springs are less expensive than the C-springs, the cost of the parts for the torsion bar device can be reduced by using the flat springs 43 and 44.

Figure 13B:
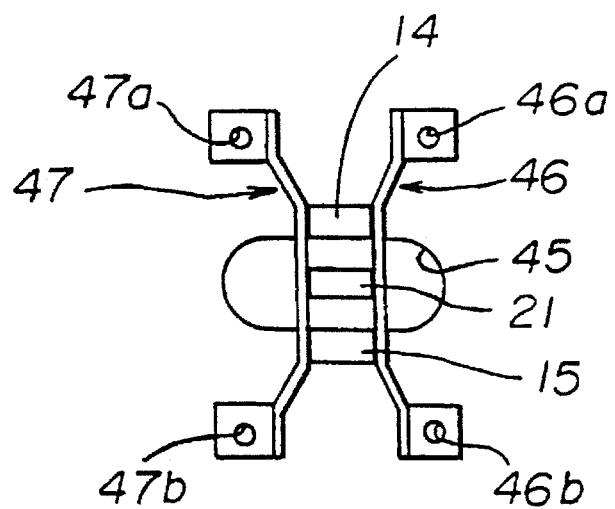

FIG. 13B shows a pair of flat springs 46 and 47 as another modification of the elastic member. The flat springs 46 and 47 are fixed onto the first cylinder 13 by using pins or rivets. The flat spring 46 is formed at its ends with holes 46a and 46b, and the flat spring 47 is formed at its ends with holes 47a and 47b. The pins or rivets are inserted in these holes, and the flat springs 46 and 47 are fixed onto the first cylinder 13 by the pins or rivets. The first and second supporting portions 14, 15 and 21 are fitted on the inward-facing walls of the flat springs 46 and 47. The first cylinder 13 is formed with the slot 45. The second supporting portion 21 is inserted in the slot 45 and it outwardly projects from the first cylinder 13. The second supporting portion 21 is movable in the circumferential direction of the second cylinder 20 within the range of the slot 45.

In the elastic member shown in FIG. 13B, the flat springs 46 and 47 can be installed on the first cylinder 13 of the torsion bar device more easily than the C-spring 22 described above. Also, the elastic member shown in FIG. 13B does not require welding equipment needed for welding the flat springs 43 and 44 to the torsion bar device. Also, as the flat springs are less expensive than the C-springs, the cost of the parts of the torsion bar device can be reduced by using the flat springs 46 and 47.

Figure 14A:
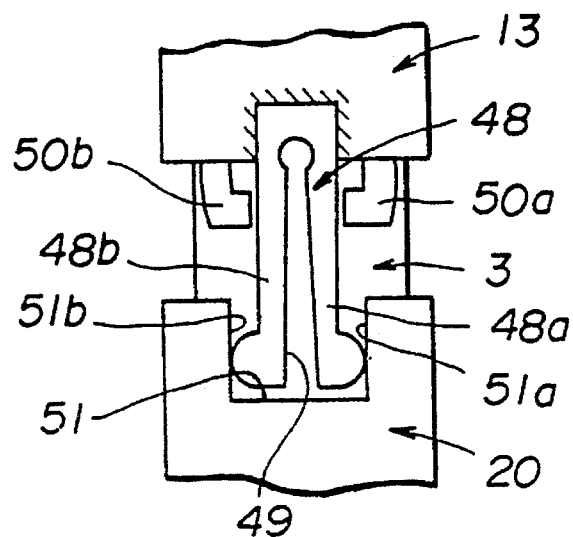
Figure 14B:
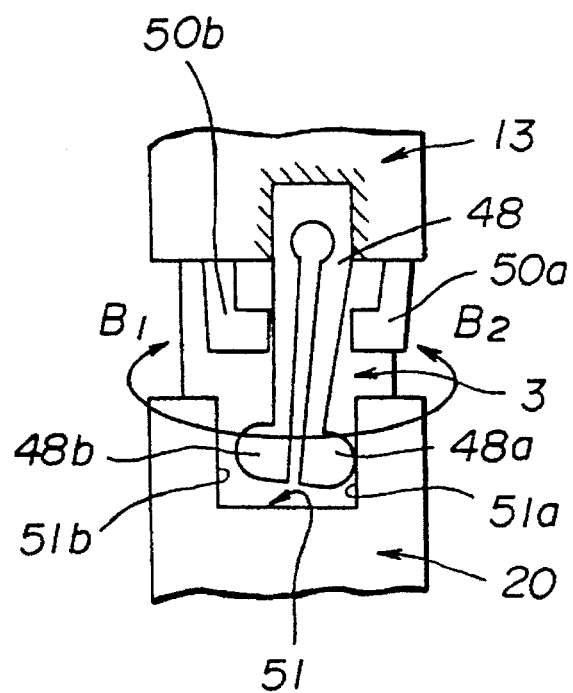

FIGS. 14A and 14B show a torsion spring 48 as a different modification of the elastic member. The torsion spring 48 is made of spring steel with a suitable mechanical strength. One end of the torsion spring 48 is fixed onto the first cylinder 13 by welding, and the welded portion is indicated by shading lines in FIGS. 14A and 14B. The torsion spring 48 is formed at its center portion with a gap 49, and the torsion spring 48 has a pair of arm portions 48a and 48b separated by the gap 49. The arm portions 48a and 48b downwardly extend from the bottom of the first cylinder 13, and the arm portions 48a and 48b have rounded ends at the leading edges.

In the torsion bar device shown in FIGS. 14A and 14B, the first cylinder 13 is formed at its bottom portion with a pair of stoppers 50a and 50b. The stoppers 50a and 50b are arranged on both sides of the torsion spring 48, and the end portions of the stoppers 50a and 50b are opposed to each other and they face the sides of the arm portions 48a and 48b in the opposite directions. Thus, the movements of the arm portions 48a and 48b in the circumferential direction of the torsion bar 3 are restricted by the stoppers 50a and 50b.

The second cylinder 20 is formed at its upper portion with a recess 51. The rounded ends of the arm portions 48a and 48b of the torsion bar 48 are brought into contact with the inside walls of the recess 51. The recess 51 has inside walls 51a and 51b. The rounded end of the arm portion 48a comes in contact with the inside wall 51a of the recess 51, and the rounded end of the arm portion 48b comes in contact with the inside wall 51b of the recess 51, as shown in FIG. 14A.

When the torsion bar 3 is twisted, for example, in the direction "B2" in FIG. 14B, due to the turning of the steering wheel, the first cylinder 13 is also moved in the direction "B2" relative to the second cylinder 20, while the second cylinder 20 remains at its original position. The arm portion 48a of the torsion spring 48 is pressed by the inside wall 51a of the recess 51 in the direction "B1" so that the arm portion 48a is elastically deformed. The arm portion 48b of the torsion spring 48 is pressed by the stopper 50b in the direction "B2" so that the arm portion 48b is elastically deformed. Thus, the first cylinder 13 and the second cylinder 20 are biased by the torsion spring 48 so as to regain the original neutral position of the steering wheel.

On the other hand, when the torsion bar 3 is twisted in the direction "B1" in FIG. 14B, the parts of the torsion bar device are moved in the directions opposite to the directions of the example mentioned above. At this time, also, the first cylinder 13 and the second cylinder 20 are biased by the torsion spring 48 so as to regain the original neutral position of the steering wheel.

In FIGS. 14A and 14B, the welded portions of the torsion spring 48 constitute the first supporting portions of the torsion bar device of the present invention, and the recess 51 of the second cylinder 20 constitutes the second supporting portion of the present invention. In the torsion bar device shown in FIGS. 14A and 14B, the torsion spring 48 can be installed on the first cylinder 13 more easily than the C-spring 22 described above. Also, as the torsion springs are less expensive than the C-springs, the cost of the parts for the torsion bar device can be reduced by using the torsion spring 48.

Next, a description will be given, with reference to FIGS. 15 through 22, of a few modifications of the first supporting portion of the first cylinder, and of a few methods of forming the first supporting portion. In FIGS. 15 through 22, the parts which are the same as corresponding parts of the above described embodiments are designated by the same reference numerals and a description thereof will be omitted.

Figure 15:
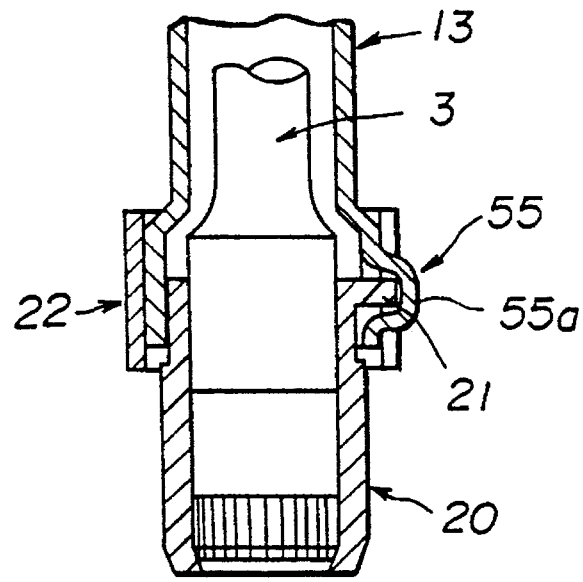
FIG. 15 is a sectional view showing a modification of a first supporting portion of the first cylinder according to the present invention.

FIG. 15 shows a first supporting portion 55 as a modification of the first supporting portions 14 and 15 of the first cylinder 13. In the above described embodiments, the first supporting portions 14 and 15 of the first cylinder 13 are separately formed. The first supporting portion 55 shown in FIG. 15 is formed into a single portion, but it includes a bridge portion 55a which is outwardly bulged. The second supporting portion 21 of the second cylinder 20 is surrounded by the bridge portion 55a. Thus, the second supporting portion 21 does not come into contact with the first supporting portion 55 even when the torsion bar 3 is twisted.

Figure 16A:
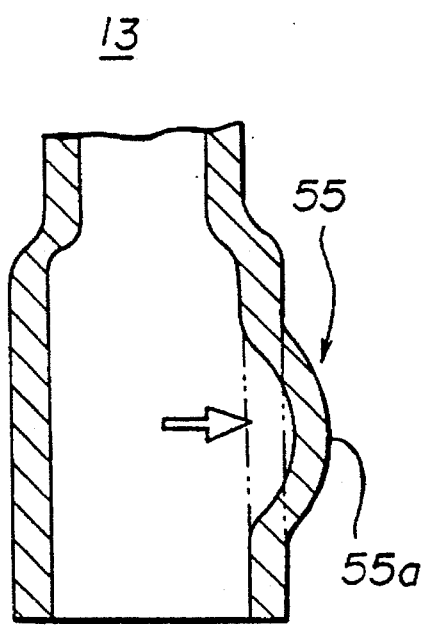
FIGS. 16A and 16B are diagrams for explaining a method of forming the first supporting portion in FIG. 15.
Figure 16B:
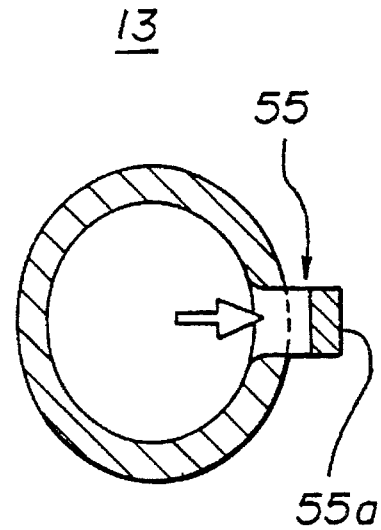

FIGS. 16A through 16B show a method of forming the first supporting portion 55 of the first cylinder 13 in FIG. 15. During assembly of the first cylinder 13, a wall portion of the first cylinder 13, corresponding in position to the second supporting portion 21 of the second cylinder 20, is plastically deformed by using a jig so as to form the outwardly bulged bridge portion 55a. The plastic deformation of the first cylinder 13 for forming the first supporting portion 55 with the bridge portion 55a is indicated by an arrow in FIG. 16A. By using this forming method in FIGS. 16A and 16B, the first supporting portion 55 with the bridge portion 55a can be easily and accurately formed from the first cylinder 13. The rigidity of the first cylinder 13 with the first supporting portion 55 is higher than that of the first cylinder 13 with the first supporting portions 14 and 15 in the above described embodiments. The first supporting portion 55 thus formed is rigid enough, and it is unlikely that it is easily bent or damaged in practical use over a long term. The reliability of the torsion bar device can be increased by using the first cylinder 13 having the first supporting portion 55.

Figure 17A:
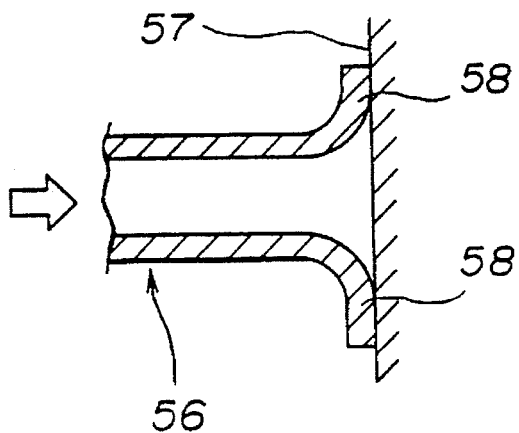
FIGS. 17A through 17D, 18A, 18B, 19, 20, 21A, 21B and 22 are diagrams for explaining various methods of forming the first supporting portions of the first cylinder in the first through third embodiments.
Figure 17B:
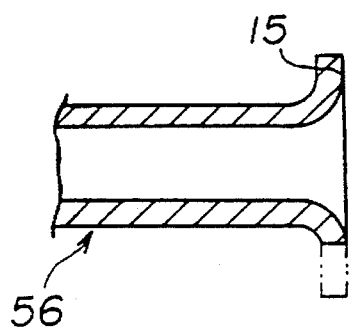
Figure 17C:
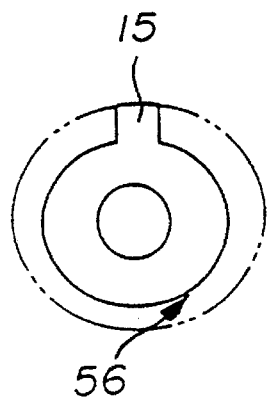
Figure 17D:
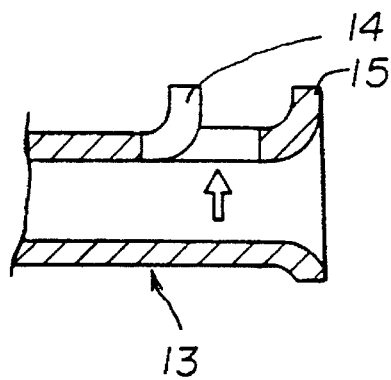

FIGS. 17A through 17D show a method of forming the first supporting portions of the first cylinder of the first through third embodiments described above. In FIG. 17A, a pipe member 56 is pressed against a flat jig 57 so that the pipe member 56 is plastically deformed to form the end of the pipe member 56 into a flared portion 58. In FIGS. 17B and 17C, the unnecessary portion (indicated by a two-dot chain line in FIGS. 17B and 17C) is removed from the flared portion 58 of the pipe member 56 by punching or cutting. The first supporting portion 15 of the first cylinder 13 is formed as shown in FIGS. 17B and 17C. In FIG. 17D, the first supporting portion 14 of the first cylinder 13 is formed by performing the punching and plastic deformation in the direction indicated by an arrow in FIG. 17D. Accordingly, the first cylinder 13 with the first supporting portions 14 and 15 can be formed.

When the forming method of FIGS. 17A through 17D is used, the first cylinder 13 having the first supporting portions 14 and 15 can be easily produced because the plastic working of pipe members can be easily performed.

Figure 18B:
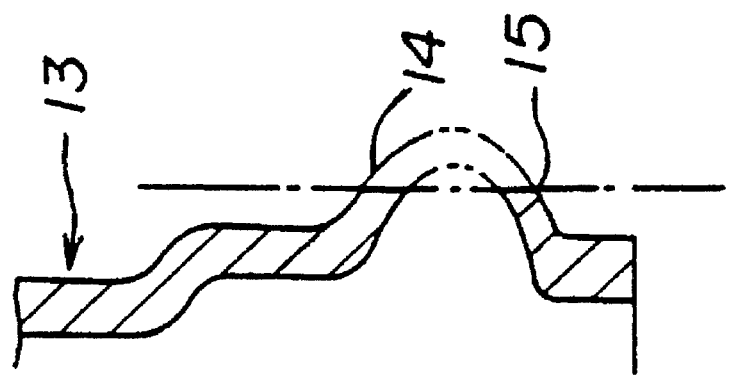
Figure 18A:
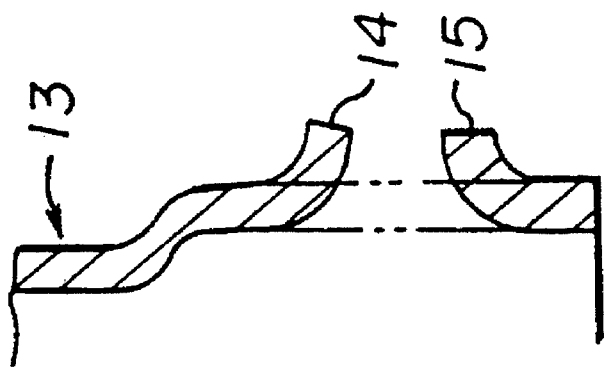

FIGS. 18A and 18B show another method of forming the first supporting portions 14 and 15 of the first cylinder 13 of the above described embodiments. In FIG. 18A, the wall of the first cylinder 13 is punched along a horizontal line in the middle between the locations corresponding to the first supporting portions 14 and 15, so that the first supporting portions 14 and 15 are formed at a time. By using the forming method shown in FIGS. 18A and 18B, the first supporting portions 14 and 15 can be very simply and efficiently produced.

After the wall of the first cylinder 13 is punched out, the punched portions of the first cylinder corresponding to the first supporting portions 14 and 15 may have rough edges, or the punched portions may deviate from each other in the horizontal direction of the first cylinder 13. In order to eliminate such problems, the grinding or cutting operation is performed for the first cylinder 13 after the wall thereof is punched along the middle line. The punched portions are ground or cut along a line at a given horizontal distance (indicated by a one-dot chain line in FIG. 18B) so that the first supporting portions 14 and 15 have smooth edges and the same distance from the axial line of the first cylinder 13 as shown in FIG. 18B.

Figure 19:
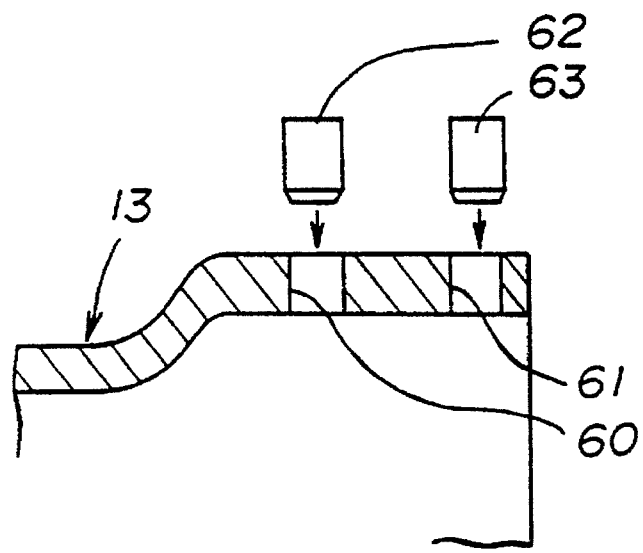

FIG. 19 shows a different method of forming the first supporting portions 14 and 15 of the first cylinder 13 of the above described embodiments. In FIG. 19, the first cylinder 13 is formed with two press-in holes 60 and 61 at the locations corresponding to the first supporting portions 14 and 15, and pins 62 and 63 are press-fitted in the holes 60 and 61 so as to form the first supporting portions 14 and 15. Since the forming of the press-in holes 60 and 61 and the fitting of the pins 62 and 63 in the holes 60 and 61 are easily performed, the first supporting portions 14 and 15 of the first cylinder 13 can be easily and efficiently formed.

The opening 13a of the first cylinder 13 in which the second supporting portion 21 is loosely fitted as shown in FIG. 6 may be formed at the same time as the press-in holes 60 and 61 are formed, or after the pins 62 and 63 are fitted in the holes 60 and 61. FIG. 19 shows the condition of the first cylinder 13 before the opening 13a of the first cylinder 13 is formed. In order to make the fixing of the pins 62 and 63 and the first cylinder 13 firm, the pins 62 and 63 may be welded to the first cylinder after the press-fitting of the pins into the holes 60 and 61.

Figure 20:
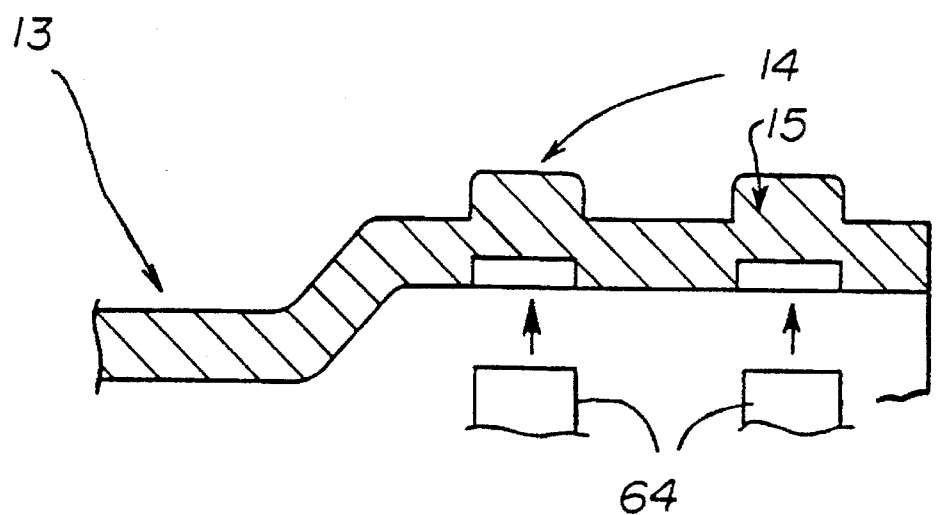

FIG. 20 shows a further different method of forming the first supporting portions 14 and 15 of the above described embodiments. In FIG. 20, the burring operation of the first cylinder 13 is performed by using a punch 64 from the inside of the first cylinder 13, so that the first supporting portions 14 and 15 are formed on the first cylinder 13 at the same time by the burring operation. Since the first supporting portions 14 and 15 of the first cylinder 13 is formed by a single burring operation, the forming of the first supporting portions 14 and 15 can be easily and efficiently accomplished by using the forming method shown in FIG. 20.

The opening 13a of the first cylinder, in which the second supporting portion 21 is loosely fitted as shown in FIG. 6, may be formed before or after the first supporting portions 14 and 15 are formed by using the forming method in FIG. 20. FIG. 20 shows the condition of the first cylinder 13 before the opening 13a of the first cylinder 13 is formed.

Figures 21A, 21B:
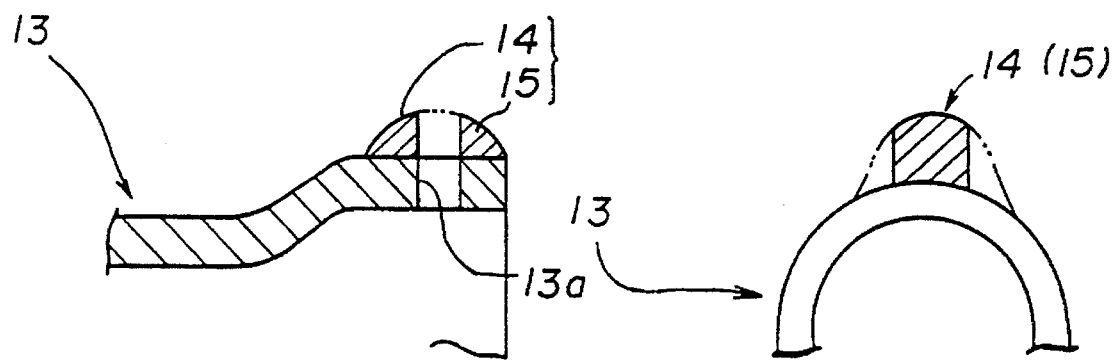

FIGS. 21A and 21B show a further different method of forming the first supporting portions 14 and 15 of the above described embodiments. In FIG. 21A, a welding material is welded to the first cylinder 13 at the locations corresponding to the first supporting portions 14 and 15. In FIG. 21B, the excess metal of the welding material indicated by a two-dot chain line in FIG. 21B is removed by cutting, at the same as the opening 13a of the first cylinder 13 shown in FIG. 21A is formed. Thus, the first supporting portions 14 and 15 of the first cylinder 13 are formed in this manner. Since the welding operation in the forming method shown in FIGS. 21A and 21B can be automatically performed in the assembly line, the first supporting portions 14 and 15 of the first cylinder 13 can be easily and efficiently formed.

Figure 22:
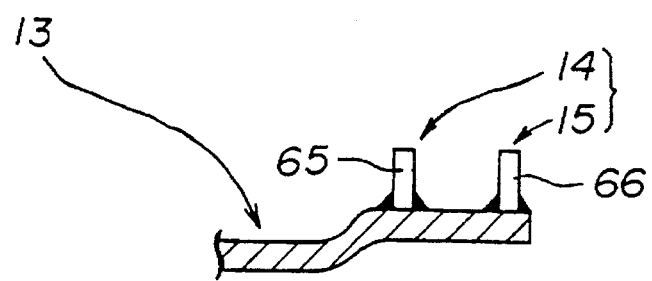

FIG. 22 shows a further different method of forming the first supporting portions 14 and 15 of the above described embodiments. In FIG. 22, pins 65 and 66 are welded to the first cylinder 13 at the locations corresponding to the first supporting portions 14 and 15 so that the first supporting portions 14 and 15 are formed. By using the forming method shown in FIG. 22, the first supporting portions 14 and 15 of the first cylinder 13 can be easily formed.

Next, a description will be given, with reference to FIGS. 23A–23C and 24A–24C, of a few methods of joining the torsion bar 3 and the first cylinder 13 together as modifications of the first through third embodiments described above. By using the same joining method which will be described in the following, the torsion bar 3 and the second cylinder 20 are also connected to each other. For the sake of convenience, only the method of joining the torsion bar 3 and the first cylinder 13 will be described, and a description of the method of joining the torsion bar 3 and the second cylinder 20 will be omitted.

In the first through third embodiments described above, the torsion bar 3 and the first cylinder 13 are connected to each other by the serrated portion 12, and the torsion bar 3 and the second cylinder 20 are connected to each other by the serrated portion 19. The serrated portions 12 and 19 of the torsion bar device, by which the torsion bar 3 and the first cylinder 13 are connected and by which the torsion bar 3 and the second cylinder 20 are connected, are vital to the safety of the power steering system. The serrrated portions must be accurately formed and firmly connected to the first and second cylinders 13 and 20 and must be straight in the longitudinal direction of the torsion bar 3. If the torsion bar 3 slides in the circumferential direction in relation to the first cylinder 13 or the second cylinder 20 when the steering wheel is turned, one cannot safely and stably operate the steering system. Also, if the first and second cylinders 13 and 20 are not correctly aligned with the torsion bar 3, it is difficult to safely and stably operate the steering system. Therefore, the joining method of the first cylinder and the torsion bar and the joining method of the second cylinder and the torsion bar are very important to the torsion bar device of the present invention.

Figure 23A:
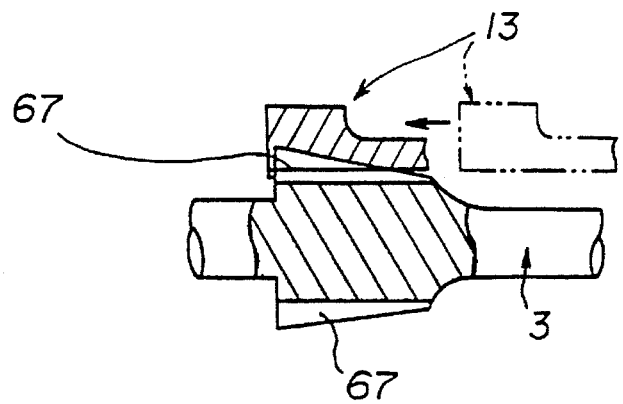
FIGS. 23A through 23C and 24A through 24C are diagrams for explaining various methods of joining the torsion bar and the first cylinder together according to the present invention.

FIG. 23A shows a tapered serration 67 of the torsion bar 3 by which the first cylinder 13 and the torsion bar 3 are connected, instead of the serrated portion 12 in the above described embodiments. The tapered serration 67 of the torsion bar 3 in FIG. 23A has an outside diameter that is gradually increased along an insertion line (indicated by an arrow in FIG. 23A) of the first cylinder 13 in the longitudinal direction of the torsion bar 3. By using the tapered serration 67 in FIG. 23A, the leading edge of the first cylinder 13 is smoothly inserted into the tapered serration 67, so that the first cylinder 13 can be easily and accurately connected to the torsion bar 3. Also, by using the tapered serration 67, it is possible to prevent the first cylinder 13 from being connected to the torsion bar 3 in a misaligned manner.

Figure 23B:
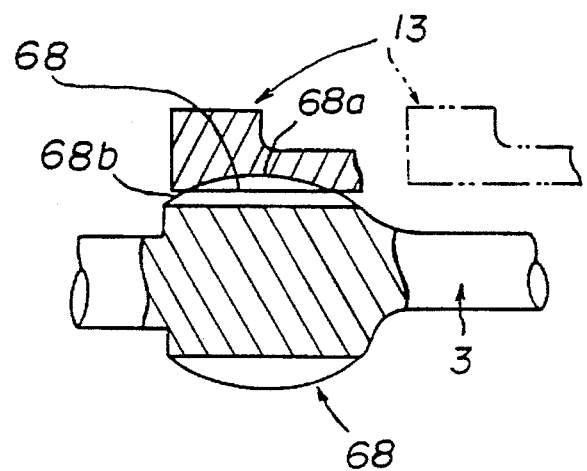

FIG. 23B shows a barrel-shaped serration 68 of the torsion bar 3 by which the first cylinder 13 and the torsion bar 3 are connected as a modification of the above described embodiments. The serration 68 of the torsion bar 3 in FIG. 23B has a barrel-shaped cross-section and has an outside diameter that varies along the longitudinal direction of the torsion bar 3, that is, it is greatest in the middle of the serration 68 and smallest at the upper and lower ends thereof as shown in FIG. 23B. By using the barrel-shaped serration 68 in FIG. 23B, the leading edge of the first cylinder 13 is smoothly inserted into the serration 68, so that the first cylinder 13 can be easily and accurately connected to the torsion bar 3. Also, the joining strength of the first cylinder 13 and the torsion bar 3 can be increased by using the serration 68 shown in FIG. 23B.

Figure 23C:
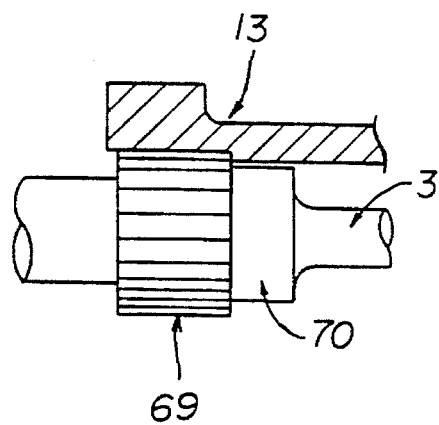

FIG. 23C shows a serration 69 of the torsion bar 3 by which the first cylinder 13 and the torsion bar 3 are connected as a modification of the above described embodiments. The serration 69 of the torsion bar 3 in FIG. 23C is provided with a guide portion 70 through which the leading edge of the first cylinder 13 is inserted into the serration 69. An aligning operation may be easily performed when the first cylinder 13 is inserted in the guide portion 70, so as to adjust the alignment between the torsion bar 3 and the first cylinder 13 . Thus, by using the serration 69 with the guide portion 70 in FIG. 23C, it is possible to accurately connect the torsion bar 3 and the first cylinder 13 together. It is possible to prevent the first cylinder 13 from being incorrectly aligned with the torsion bar 3.

Figure 24A:
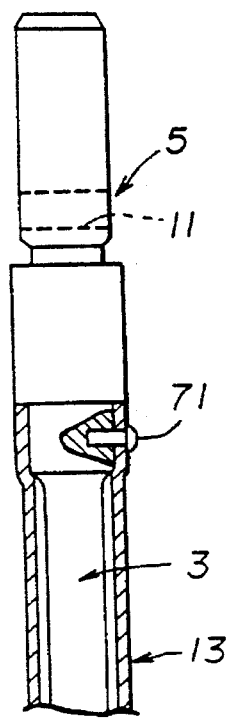
Figure 24B:
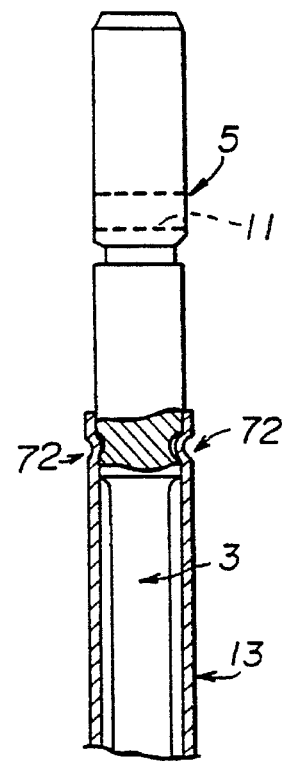
Figure 24C:
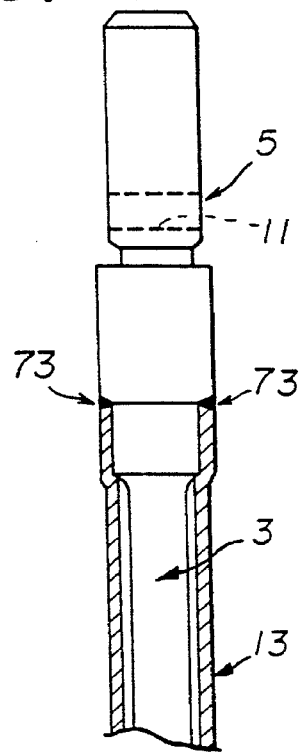

FIGS. 24A through 24C show various methods of joining the torsion bar 3 and the first cylinder 13 without using a serration. By the same joining method described here, the torsion bar 3 and the second cylinder 20 may be joined together.

FIG. 24A shows a connecting pin 71 by which the first cylinder 13 and the torsion bar 3 are joined together. By using the connecting pin 71 in FIG. 24A, it is possible to stably prevent the first cylinder 13 from sliding relative to the torsion bar 3 in the circumferential direction when the steering wheel is turned. As using the connecting pins is less expensive than using the serrated portions 12 and 19, the cost of the parts of the torsion bar device can be reduced by using the connecting pin 71.

FIG. 24B shows staked portions 72 by which the first cylinder 13 and the torsion bar 3 are joined together. By using the staked portions 72 in FIG. 24B, it is possible to easily and stably join the first cylinder 13 and the torsion bar 3. As using the staked portions is less expensive than using the serrated portions 12 and 19, the cost of the parts of the torsion bar device can be reduced by using the staked portions 72.

FIG. 24C shows welded portions 73 by which the first cylinder 13 and the torsion bar 3 are joined together. By using the welded portions 73 in FIG. 24C, it is possible to stably prevent the first cylinder 13 from sliding relative to the torsion bar 3 in the circumferential direction when the steering wheel is turned. Also, it is possible to easily and stably join the first cylinder 13 and the torsion bar 3.

In the first through third embodiments described above, the second cylinder 20 is connected to the serrated portion 19 of the lower connecting portion 7 of the torsion bar 3, and the first cylinder 13 is connected to the serrated portion 12 below the upper connecting portion 5. However, the methods of connecting the second cylinder 20 and the torsion bar 3 and of connecting the first cylinder 13 and the torsion bar 3 according to the present invention are not limited to these embodiments. Those skilled in the art may recognize as a matter of course that the second cylinder 20 can be connected to the upper connecting portion 5 while the first cylinder 13 can be connected to the lower connecting portion 7 in the torsion bar device of the present invention.

As described in the foregoing, it is possible to easily adapt the present invention to the existing production vehicles by replacement of the conventional torsion bar by the torsion bar device of the present invention. The structure of the torsion bar device of the present invention is simple and needs no modification of the other parts related to the power steering system. Thus, according to the present invention, the structure of the power steering system in which the torsion bar device is incorporated can be made simple, and the productivity and cost performance thereof can be remarkably increased.

In addition, in the torsion bar device according to the present invention, a restricting member is provided, in the clearance space between the torsion bar and the first cylinder, for restricting the horizontal movement of the first cylinder 13 relative to the torsion bar 3 when the torsion bar 3 is twisted due to the turning of the steering wheel. It is thus possible for the torsion bar device of the present invention to very stably regain the original neutral position of the steering wheel. The rigidity of the torsion bar device when the steering wheel is around its original neutral position can be remarkably increased.

In addition, in the torsion bar device according to the present invention, a plurality of preload units each of which includes the first supporting portions, the second supporting portion and the elastic member are arranged such that the respective first and second supporting portions of the preload units are uniformly arranged on the circumference of the torsion bar 3. When the torsion bar 3 is twisted and the plurality of the elastic members are expanded due to the turning of the steering wheel, the reaction forces from the elastic members are canceled by each other and they are in equilibrium. It is thus possible to stably prevent the first cylinder 13 from being horizontally moved relative to the torsion bar 3 when the torsion bar 3 is twisted and the elastic members are expanded due to the turning of the steering wheel.

Further, the present invention is not limited to the above described embodiments, and various variations and modifications may be made without departing from the scope of the present invention.

What is claimed is:

1. A torsion bar device for a power steering system, comprising:
   a torsion bar having a torsional portion, an upper connecting portion associated with an input shaft, and a lower connecting portion associated with an output shaft;
   first cylinder means for encompassing said torsional portion of said torsion bar, one end of said first cylinder means being connected to one of said upper and lower connecting portions of said torsion bar, and the other end of said first cylinder means extending in the longitudinal direction of the torsion bar to the other connecting portion of the torsion bar;
   second cylinder means for encompassing and being connected to the other one of said upper and lower connecting portions of said torsion bar;
   first supporting means for supporting said torsion bar at said other end of the first cylinder means in a circumferential direction of the torsion bar;
   second supporting means for supporting said torsion bar in the circumferential direction at a portion of said second cylinder means where said second supporting means is aligned with said first supporting means; and
   elastic means for elastically restoring the alignment of the first and second supporting means by applying a force in a direction opposite to a torsionally stressed circumferential direction of the torsion bar when a steering wheel is turned so as to regain an original neutral position of the steering wheel, wherein said elastic means is a torsion coil spring with a snapping portion in which the first and second supporting means are fitted.

2. A torsion bar device according to claim 1, further comprising restricting means for preventing the first cylinder means from being horizontally moved relative to the torsion bar when the torsion bar is torsionally stressed and the elastic means is expanded due to the turning of the steering wheel.

3. A torsion bar device according to claim 2, wherein said restricting means is arranged in a clearance space between the torsion bar and the first cylinder means so that the torsion bar is rotatably supported by the restricting means.

4. A torsion bar device according to claim 2, wherein said restricting means is a bearing portion formed integrally with the first cylinder means in a clearance space between the torsion bar and the first cylinder means so that the torsion bar is rotatably supported by the bearing portion.

5. A torsion bar device for a power steering system, comprising:
   a torsion bar having a torsional portion, an upper connecting portion associated with an input shaft, and a lower connecting portion associated with an output shaft;
   first cylinder means for encompassing said torsional portion of said torsion bar, one end of said first cylinder means being connected to the upper connecting portion of the torsion bar, and the other end of said first cylinder means extending in the longitudinal direction of the torsion bar to the lower connecting portion of the torsion bar;
   second cylinder means for encompassing and being connected to the lower connecting portion of the torsion bar; and
   a plurality of pre-load units, connected to said first and second cylinder means, each of said preload units comprising:
   first supporting means for supporting said torsion bar at said other end of the first cylinder means in a circumferential direction of the torsion bar;
   second supporting means for supporting said torsion bar in the circumferential direction at a portion of said second cylinder means where said second supporting means is aligned with said first supporting means; and
   elastic means for elastically restoring the alignment of the first and second supporting means by applying a force in a direction opposite to a torsionally stressed circumferential direction of the torsion bar when a steering wheel is turned, so as to regain an original neutral position of the steering wheel,
   wherein the respective first and second supporting means of the plurality of the pre-load units are uniformly arranged on the circumference of the torsion bar.

6. A torsion bar device according to claim 5, wherein said elastic means of each of said pre-load units is an annular spring with a gap in which the first and second supporting means are fitted.

7. A torsion bar device according to claim 5, wherein said device comprises three pre-load units, and the respective first and second supporting means of the three pre-load units are uniformly arranged on the circumference of the torsion bar.

8. A torsion bar device for a power steering system, comprising:
   a torsion bar having a torsional portion, an upper connecting portion associated with an input shaft, and a lower connecting portion associated with an output shaft;
   first cylinder means for encompassing said torsional portion of said torsion bar, one end of said first cylinder means being connected to one of said upper and lower connecting portions of said torsion bar, and the other end of said first cylinder means extending in the longitudinal direction of the torsion bar to the other connecting portion of the torsion bar;
   second cylinder means for encompassing and being connected to the other one of said upper and lower connecting portions of said torsion bar;
   first supporting means for supporting said torsion bar at said other end of the first cylinder means in a circumferential direction of the torsion bar;

second supporting means for supporting said torsion bar in the circumferential direction at a portion of said second cylinder means where said second supporting means is aligned with said first supporting means; and elastic means for elastically restoring the alignment of the first and second supporting means by applying a force in a direction opposite to a torsionally stressed circumferential direction of the torsion bar when a steering wheel is turned so as to regain an original neutral position of the steering wheel, wherein said elastic means is a pair of flat springs by means of which the first and second supporting means are kept in alignment.

9. A torsion bar device according to claim 8, further comprising restricting means for preventing the first cylinder means from being horizontally moved relative to the torsion bar when the torsion bar is torsionally stressed and the elastic means is expanded due to the turning of the steering wheel.

10. A torsion bar device according to claim 9, wherein said restricting means is arranged in a clearance space between the torsion bar and the first cylinder means so that the torsion bar is rotatably supported by the restricting means.

11. A torsion bar device according to claim 9, wherein said restricting means is a bearing portion formed integrally with the first cylinder means in a clearance space between the torsion bar and the first cylinder means so that the torsion bar is rotatably supported by the bearing portion.

12. A torsion bar device for a power steering system, comprising:

a torsion bar having a torsional portion, an upper connecting portion associated with an input shaft, and a lower connecting portion associated with an output shaft;

first cylinder means directly adjacent said torsion bar for encompassing said torsional portion of said torsion bar, one end of said first cylinder means being connected to one of said upper and lower connecting portions of said torsion bar, and the other end of said first cylinder means extending in the longitudinal direction of the torsion bar to the other connecting portion of the torsion bar;

second cylinder means directly adjacent said torsion bar for encompassing and being connected to the other one of said upper and lower connecting portions of said torsion bar;

first supporting means provided in said first cylinder means for supporting said torsion bar at said other end of the first cylinder means in a circumferential direction of the torsion bar;

second supporting means provided in said second cylinder means for supporting said torsion bar in the circumferential direction at a portion of said second cylinder means where said second supporting means is aligned with said first supporting means;

elastic means for elastically restoring the alignment of said first supporting means and said second supporting means when a steering wheel is turned, said elastic means applying a force to said first supporting means and said second supporting means in a direction opposite to a torsionally stressed circumferential direction of the torsion bar to regain an original neutral position of the steering wheel, wherein said elastic means includes a gap in which said first and second support means are fitted; and restricting means for preventing a horizontal movement of said first cylinder means relative to the torsion bar when the torsion bar is torsionally stressed and the elastic means is expanded due to the turning of the steering wheel.

13. The torsion bar device according to claim 12, wherein said restricting means is arranged in a clearance space between the torsion bar and the first cylinder means so that the torsion bar is rotatably supported by the restricting means.

14. The torsion bar device according to claim 12, wherein said restricting means is a bearing portion formed integrally with the first cylinder means in a clearance space between the torsion bar and the first cylinder means so that the torsion bar is rotatably supported by the bearing portion.

* * * * *